US012561268B2

(12) United States Patent
Heo et al.

(10) Patent No.: US 12,561,268 B2
(45) Date of Patent: Feb. 24, 2026

(54) DEVICE AND METHOD FOR ADAPTIVE BUS PROTOCOL

(71) Applicant: Samsung Electronics Co., Ltd., Suwon-si (KR)

(72) Inventors: Ingoo Heo, Suwon-si (KR); Youngwook Noh, Suwon-si (KR); Kwangsoo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

(21) Appl. No.: 18/534,157

(22) Filed: Dec. 8, 2023

(65) Prior Publication Data

US 2024/0202156 A1    Jun. 20, 2024

(30) Foreign Application Priority Data

Dec. 16, 2022    (KR) ......................... 10-2022-0177541

(51) Int. Cl.
*G06F 13/40*        (2006.01)

(52) U.S. Cl.
CPC ...... *G06F 13/4068* (2013.01); *G06F 2213/40* (2013.01)

(58) Field of Classification Search
CPC ............. G06F 13/4068; G06F 2213/40; G06F 13/1678; G06F 13/4234; G06F 13/42; G06F 13/1668; H04L 12/40; H04L 69/18
See application file for complete search history.

(56) References Cited

U.S. PATENT DOCUMENTS

| | | | |
|---|---|---|---|
| 6,816,921 B2 | 11/2004 | Jahnke et al. | |
| 9,384,855 B2 | 7/2016 | Lee et al. | |
| 9,552,205 B2 | 1/2017 | Ermolaev et al. | |
| 10,001,995 B2 | 6/2018 | Van Dalen et al. | |
| 11,068,264 B2 | 7/2021 | Hasenplaugh et al. | |
| 2004/0153594 A1* | 8/2004 | Rotvold ............. | G05B 19/4186 |
| | | | 710/305 |
| 2006/0090024 A1* | 4/2006 | Tanabe .................. | G06F 13/364 |
| | | | 710/110 |
| 2008/0294820 A1* | 11/2008 | Croxford ............ | G06F 13/4018 |
| | | | 710/105 |

(Continued)

FOREIGN PATENT DOCUMENTS

CN        110781117 A      2/2020

OTHER PUBLICATIONS

Extended European Search Report issued Apr. 25, 2024 in European Application No. 23217158.7.

*Primary Examiner* — Farley Abad
(74) *Attorney, Agent, or Firm* — Harness, Dickey & Pierce, P.L.C.

(57)        ABSTRACT

Apparatuses and methods are disclosed. The apparatus includes a bus master including processing circuitry and a bus interface. The processing circuitry is configured to control operation of the bus master such that the bus master transmits a first address to a bus slave through a bus in a first mode and to transmit a second address having a same first length as the first address to the bus slave through the bus in a second mode. The bus interface is configured to generate the second address such that the second address includes a plurality of short addresses corresponding to a plurality of special function registers of the bus slave, respectively, in the second mode.

20 Claims, 16 Drawing Sheets

(56)                         References Cited

U.S. PATENT DOCUMENTS

2011/0047355 A1*   2/2011   Mejdrich ............... G06F 9/342
                                                            712/225
2019/0034374 A1*   1/2019   Kim ................... G06F 13/4282
2022/0066776 A1     3/2022   Stevens et al.

* cited by examiner

```
                                              ⌐400
10  Write(0x1004, 0x8a)
11  Write(0x1008, 0x75)
12  Write(0x1104, 0xab)
13  Write(0x1108, 0xce)
14  Write(0x1204, 0xbe)
15  Write(0x1208, 0xa1)
16  Write(0x1334, 0xcc)
17  Write(0x1338, 0x34)
```

| | Address | | | | Data | | | |
|---|---|---|---|---|---|---|---|---|
| T1 | 0x42 | 0x41 | 0x02 | 0x01 | 0xce | 0xab | 0x75 | 0x8a |
| T2 | 0xc2 | 0xc1 | 0x82 | 0x81 | 0x34 | 0xcc | 0xa1 | 0xbe |

```
400
10  Write(0x1004, 0x8a)
11  Write(0x1008, 0x75)
12  Write(0x1104, 0xab)
13  Write(0x1108, 0xce)
14  Write(0x1204, 0xbe)
15  Write(0x1208, 0xa1)
16  Write(0x1334, 0xcc)
17  Write(0x1338, 0x34)
```

|   | Address | | | | Data | | | |
|---|---|---|---|---|---|---|---|---|
| T1 | 0x01 | 0x3f | 0x01 | 0x01 | 0xce | 0xab | 0x75 | 0x8a |
| T2 | 0x01 | 0x3f | 0x01 | 0x3f | 0x34 | 0xcc | 0x02 | 0xbe |

FIG. 10

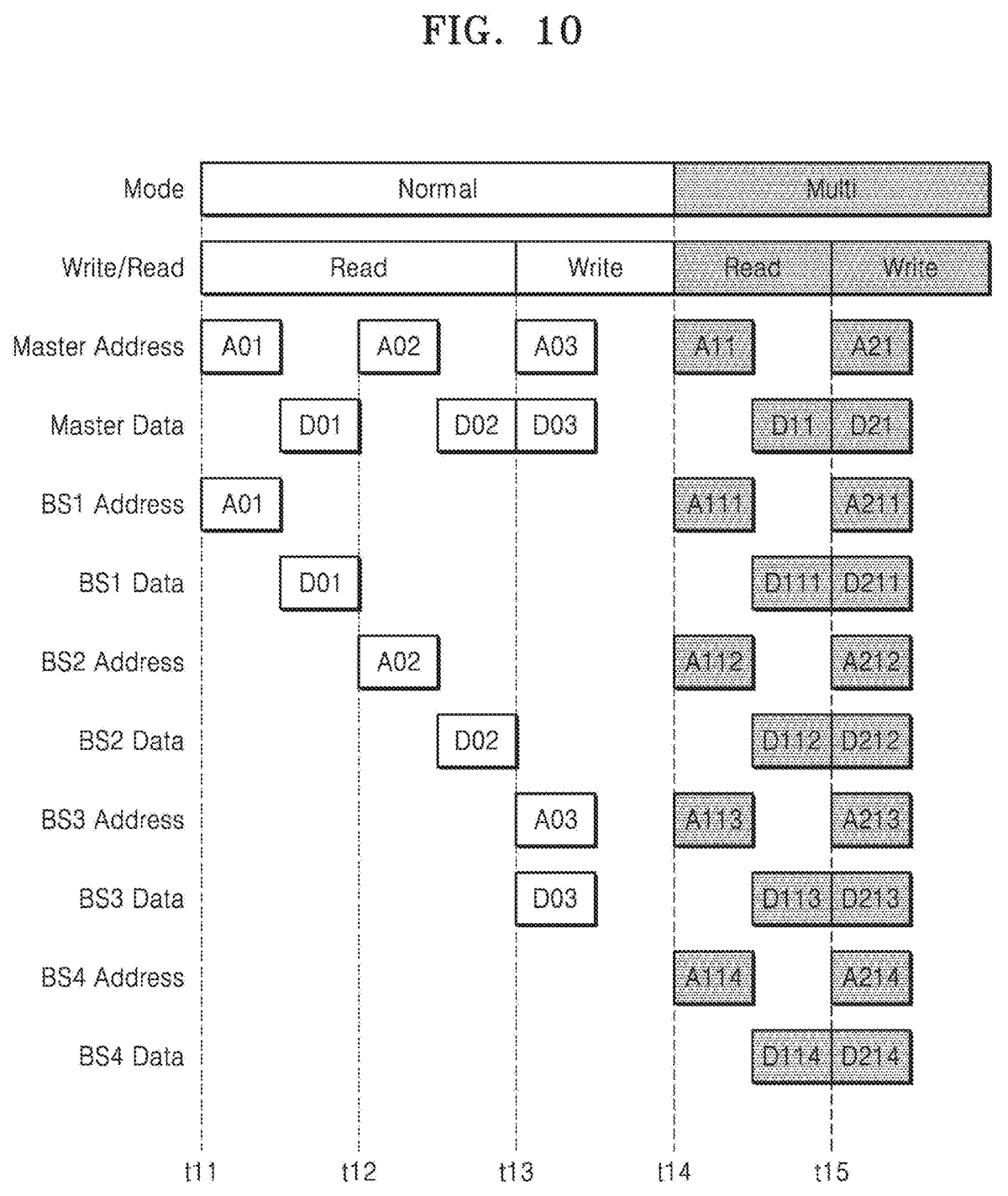

| | Normal | | | Multi | |
|---|---|---|---|---|---|
| Mode | Normal | | | Multi | |
| Write/Read | Read | | Write | Read | Write |
| Master Address | A01 | A02 | A03 | A11 | A21 |
| Master Data | D01 | D02 | D03 | D11 | D21 |
| BS1 Address | A01 | | | A111 | A211 |
| BS1 Data | D01 | | | D111 | D211 |
| BS2 Address | | A02 | | A112 | A212 |
| BS2 Data | | D02 | | D112 | D212 |
| BS3 Address | | | A03 | A113 | A213 |
| BS3 Data | | | D03 | D113 | D213 |
| BS4 Address | | | | A114 | A214 |
| BS4 Data | | | | D114 | D214 | t11     t12     t13     t14     t15

DEVICE AND METHOD FOR ADAPTIVE BUS PROTOCOL

CROSS-REFERENCE TO RELATED APPLICATION

This application is based on and claims priority under 35 U.S.C. § 119 to Korean Patent Application No. 10-2022-0177541, filed on Dec. 16, 2022, in the Korean Intellectual Property Office, the disclosure of which is incorporated by reference herein in its entirety.

BACKGROUND

The inventive concepts relate to a bus, and more particularly, to an apparatus and method for an adaptive bus protocol.

A system may include various components, and the components may communicate with each other through a bus. The bus may be designed based on a bus protocol, and the components may communicate with each other according to the bus protocol. To meet the demand for high bandwidth, such as memory access, the bus may have a wide width, that is, a wide address width and/or a wide data width. In addition, the bus protocol may allow single access with a single transfer. The structure and protocol of the bus described above may be inefficient for accessing a relatively narrow target, such as a register in a component.

SUMMARY

The inventive concepts provide an apparatus and method for providing high efficiency by an adaptive bus protocol.

According to an example embodiment of the inventive concepts, there is provided an apparatus including a bus master including processing circuitry and a bus interface. The processing circuitry is configured to control operation of the bus master such that the bus master transmits a first address to a bus slave through a bus in a first mode and to transmit a second address having a same length as the first address to the bus slave through the bus in a second mode. The bus interface is configured to generate, in the second mode, the second address such that the second address may include a plurality of short addresses corresponding to a plurality of special function registers of the bus slave, respectively.

According to another example embodiment of the inventive concepts, there is provided a method. A first address may be transmitted to a bus slave through a bus in a first mode, and a second address may be generated in a second mode such that the second address may include a plurality of short addresses corresponding to a plurality of special function registers of the bus slave, respectively, and may have the same first length as the first address. The second address may be transmitted to the bus slave through the bus in the second mode.

According to another example embodiment of the inventive concepts, there is provided an apparatus including a bus configured to receive a first address from a bus master in a first mode and a second address having the same first length as the first address from the bus master in a second mode. The bus may include a plurality of slave interfaces configured to communicate with a plurality of bus slaves, respectively; and a controller controlling the plurality of slave interfaces to have access to a plurality of special function registers based on the second address in the second mode.

Each of the plurality of bus slaves include one of the plurality of special function registers.

According to an example embodiment of the inventive concepts, there is provided a method. A first address may be received from a bus master in a first mode, and a second address having the same first length as the first address may be received from the bus master in a second mode. A plurality of register addresses may be generated based on the second address in the second mode and the plurality of register addresses may correspond to a plurality of special function registers included in a plurality of bus slaves, respectively. The plurality of register addresses may be transmitted to the plurality of bus slaves in the second mode.

BRIEF DESCRIPTION OF THE DRAWINGS

Example embodiments will be more clearly understood from the following detailed description taken in conjunction with the accompanying drawings in which:

FIG. 10 is a timing diagram showing an operation of performing an adaptive bus protocol, according to an example embodiment;

DETAILED DESCRIPTION OF THE EXAMPLE EMBODIMENTS

Figure 1:
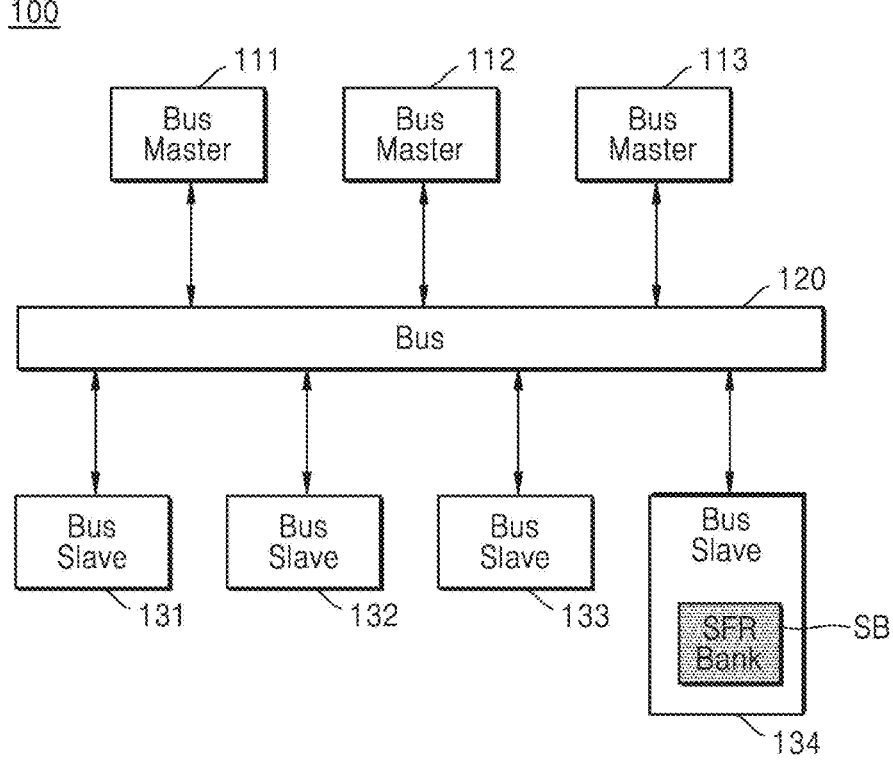
FIG. 1 is a block diagram showing a system according to an example embodiment.

FIG. 1 is a block diagram showing a system 100 according to an example embodiment. As shown in FIG. 1, the system 100 according to an example embodiment may include first to third bus masters 111 to 113, a bus 120, and first to fourth bus slaves 131 to 134. In some example embodiments, the system 100 may include a different number of bus masters and bus slaves as shown in FIG. 1. Each of the blocks shown in FIG. 1 and a single block in the drawings herein may have any structure designed to perform its given function. For example, a single block may include at least one of a hardware logic designed by logical synthesis, a memory storing software containing a set of instructions, a processor for executing the instructions, and a software module stored in the memory and executed by at least a common processor.

The system 100 may refer to any system including the bus 120. In some example embodiments, the system 100 may include a computing system, such as a personal computer, a server, a smartphone, and a wearable device. In some example embodiments, the system 100 may be a system-on-chip (SoC) manufactured by a semiconductor process. The components connected to the bus 120, that is, the first to third bus masters 111 to 113 and the first to fourth bus slaves 131 to 134, may communicate with one another through the bus 120. In some example embodiments, the system 100 may include a hierarchical bus structure, and the bus 120 may be a lower bus (e.g., a peripheral bus or a local bus) connected to an upper bus (e.g., a system main bus or a peripheral bus).

Each of (or alternatively, at least one of) the first to third bus masters 111 to 113 may start a transaction through the bus 120. For example, each of (or alternatively, at least one of) the first to third bus masters 111 to 113 may transmit an access request to the bus 120 for at least one of the first to fourth bus slaves 131 to 134 and receive a response from the bus 120. In some example embodiments, the first to third bus masters 111 to 113 may include a central processing unit (CPU), a graphics processing unit (GPU), a microcontroller unit (MCU), etc. A bus master may be simply referred to as a master herein.

The first to fourth bus slaves 131 to 134 may respond to a transaction initiated by the bus master. For example, each of (or alternatively, at least one of) the first to fourth bus slaves 131 to 134 may transmit a response to an access request, which is received from one of the first to third bus masters 111 to 113, to the bus 120. In some example embodiments, the first to fourth bus slaves 131 to 134 may include a memory, a memory controller, hardware intellectual property (IP), etc. A bus slave may be simply referred to as a slave herein.

The bus 120 may be used as a means for transmitting and receiving data, and the data may be accessed by an address. The bus 120 may be designed to comply with a bus protocol, and the bus protocol may define how the bus masters and the bus slaves transmit or receive data. The bus 120 may have a wide width. For example, the first bus slave 131 may include a memory, and the bus 120 may support a wide width of addresses and/or data so as to make the most use of the bandwidth of the memory.

The bus slave such as the hardware IP may include registers accessible by the bus master, and the registers may store values setting an operation of the bus slave or corresponding to a state of the bus slave. For example, as illustrated in FIG. 1, the fourth bus slave 134 may include a special function register (SFR) bank SB, and the special function register bank SB may include a plurality of special function registers accessible by at least one of the first to third bus masters 111 to 113. The fourth bus slave 134 may operate based on the value of the special function register and may store a value indicating the operation state in the special function register. Accordingly, the bus master may control the operation of the bus slave by writing a value in the special function register and may check the operation of the bus slave by reading the value stored in the special function register.

As described above, the bus 120 may have a relatively wide width due to the memory of the bus slave, but the register in the special function register bank SB may have a relatively narrow width. For example, a single transfer on the bus 120 may include an address of 40 bits or more and/or data of 256 bits, 128 bits, 64 bits, or 32 bits, and the special function register bank SB may include dozens or hundreds of 8-bit special function register. Accordingly, many bits may be wasted in accessing the special function register through the bus 120, and as a result, the effective bandwidth of the bus 120 may be significantly reduced.

As described below with reference to the drawings, the bus protocol may support a variable width of addresses and/or data. For example, a mode may be dynamically set by the bus master, and the width of the address and/or the data may be changed according to the mode. Accordingly, an access time to the special function register through the bus 120 may be reduced, and the efficiency and performance of the bus 120 and the system 100 may increase. In addition, such an adaptive bus protocol may be easily adapted to the system 100, and the adaptive bus protocol may be applicable to various applications.

Figure 2:
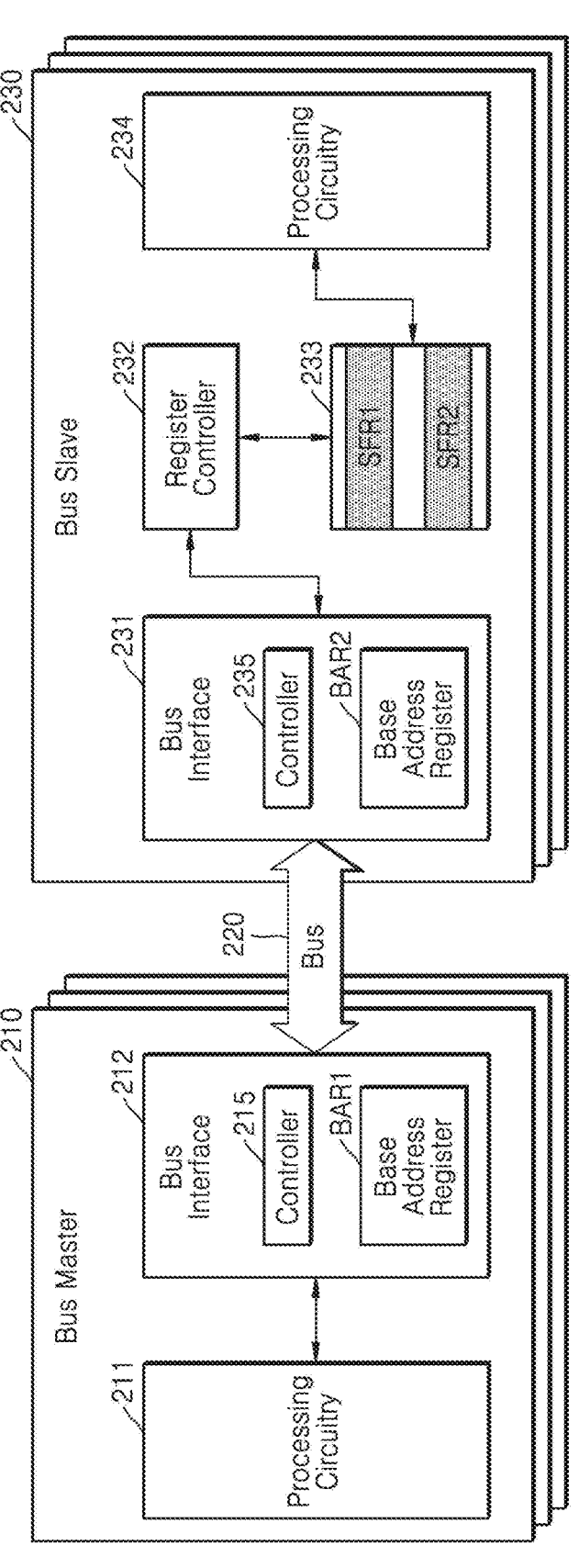
FIG. 2 is a block diagram illustrating a system according to an example embodiment.

FIG. 2 is a block diagram illustrating a system 200 according to an example embodiment. As illustrated in FIG. 2, the system 200 may include a bus master 210, a bus 220, and a bus slave 230. As described above with reference to FIG. 1, the bus master 210 and the bus slave 230 may communicate with each other through the bus 220 based on the bus protocol. With respect to FIG. 2, redundant descriptions of FIG. 1 are omitted.

The bus master 210 may include processing circuitry 211 and a bus interface 212. The processing circuitry 211 may perform a designed function of the bus master 210. For example, when the bus master 210 includes a CPU, the processing circuitry 211 may include at least one processing core and at least one cache memory. In some example embodiments, the processing circuitry 211 may issue an access (e.g., write or read) to a plurality of special function registers. For example, the processing circuitry 211 may provide a plurality of addresses corresponding to a plurality of special function registers, respectively, to the bus interface 212. In addition, the processing circuitry 211 may provide a plurality of values, which are to be written to a plurality of special function registers, to the bus interface 212, or may receive a plurality of values, which are read from the special function registers, from the bus interface 212.

The processing circuitry 211 may determine a mode for having access to the special function registers and may provide a signal to the bus interface 212 for setting the determined mode. For example, when an access to the memory or to a single special function register is required (or alternatively, desired), the processing circuitry 211 may determine a normal mode, and when an access to a plurality of special function registers is required (or alternatively, desired), the processing circuitry 211 may determine a pack mode or a multi-mode.

The bus interface 212 may be connected to the bus 220 and may communicate with the bus slave 230 through the bus 220 according to the bus protocol. For example, the bus interface 212 may transmit a request for an access to the bus slave 230, which is issued by the processing circuitry 211, to the bus slave 230 through the bus 220 according to the bus protocol. In addition, the bus interface 212 may receive transmission from the bus slave 230 through the bus 220, and may extract information from the transmission according to the bus protocol and provide the information to the processing circuitry 211.

As illustrated in FIG. 2, the bus interface 212 may include a base address register BAR1 and a controller 235. The controller 215 may control operations of the bus interface 212 and interface with the base address register BAR1. The base address register BAR1 may store a base address. As described below with reference to FIG. 3, a single transmission (or request) may include accesses to two or more special function registers in the pack mode. To this end, an address, which is transmitted through the bus 220, may include a plurality of short addresses. A base address may be determined in advance, and the short addresses may be generated based on the base address in the bus master 210 and may be decoded based on the base address in the bus slave 230. The bus master 210 or the bus interface 212 may provide the base address to the bus slave 230 in advance, and thus, the base address may be shared with the bus master 210 and the bus slave 230. In some example embodiments, the short address may correspond to a relative address based on the base address. Herein, the base address register BAR1 in the bus master 210 may be referred to as a first base address register.

The bus slave 230 may include a bus interface 231, a register controller 232, a special function register bank 233, and processing circuitry 234. The bus interface 231 may be connected to the bus 220 and may communicate with the bus master 210 through the bus 220 according to the bus protocol. For example, the bus interface 231 may receive a request for an access to the bus slave 230 from the bus master 210 and decode the access request according to the bus protocol. In addition, the bus slave 230 may generate a response to the access request, which is received from the bus master 210, according to the bus protocol and may transmit the response to the bus master 210 through the bus 220.

As illustrated in FIG. 2, the bus interface 231 may include a base address register BAR2 and a controller 235. The controller 235 may control operations of the bus interface 231 and interface with the base address register BAR2. The base address register BAR2 may store the base address like the base address register BAR1 in the bus master 210. As described above, the base address may be provided from the bus master 210 through the bus 220, and the bus interface 231 may store the received base address to the base address register BAR2. Herein, the base address register BAR2 in the bus slave 230 may be referred to as a second base address register.

The register controller 232 may communicate with the bus interface 231 and control an access to the special function register bank 233. For example, the register controller 232 may receive a write request from the bus interface 231 and write a value in the special function register of the special function register bank 233 in response to the write request. In addition, the register controller 232 may receive a read request from the bus interface 231 and read a value from the special function register of the special function register bank 233 in response to the read request and then provide the value to the bus interface 231.

The register controller 232 may decode the access request received through the bus interface 231 and generate a response that is to be transferred to the bus interface 231, according to the mode. For example, in the pack mode, the register controller 232 may identify two or more special function registers (e.g., a first special function register SFR1 and a second special function register SFR2) in the special function register bank 233, and may control each access to the first special function register SFR1 and the second special function register SFR2, based on the short addresses provided from the bus interface 231 and the base address stored in the base address register BAR2. In some example embodiments, the register controller 232 may be included in the bus interface.

The special function register bank 233 may include a plurality of special function registers. For example, as illustrated in FIG. 2, the special function register bank 233 may include the first special function register SFR1 and the second special function register SFR2. As described above with reference to FIG. 1, the special function register bank 233 may include a special function register for storing a value for setting the operation of the processing circuitry 234 and a special function register for storing a value indicating an operation state of the processing circuitry 234.

The processing circuitry 234 may perform a designed function of the bus slave 230. For example, the bus slave 230 may be designed to provide a communication channel to the system 200 and may perform an operation corresponding to at least one layer (e.g., PHY or LINK) in a communication model, such as an open systems interconnection (OSI) model. The processing circuitry 234 may have access to the special function register bank 233. For example, the processing circuitry 234 may be operated based on a value stored in the special function register, and may write a value, which indicates an operation result, in the special function register.

Figure 3:
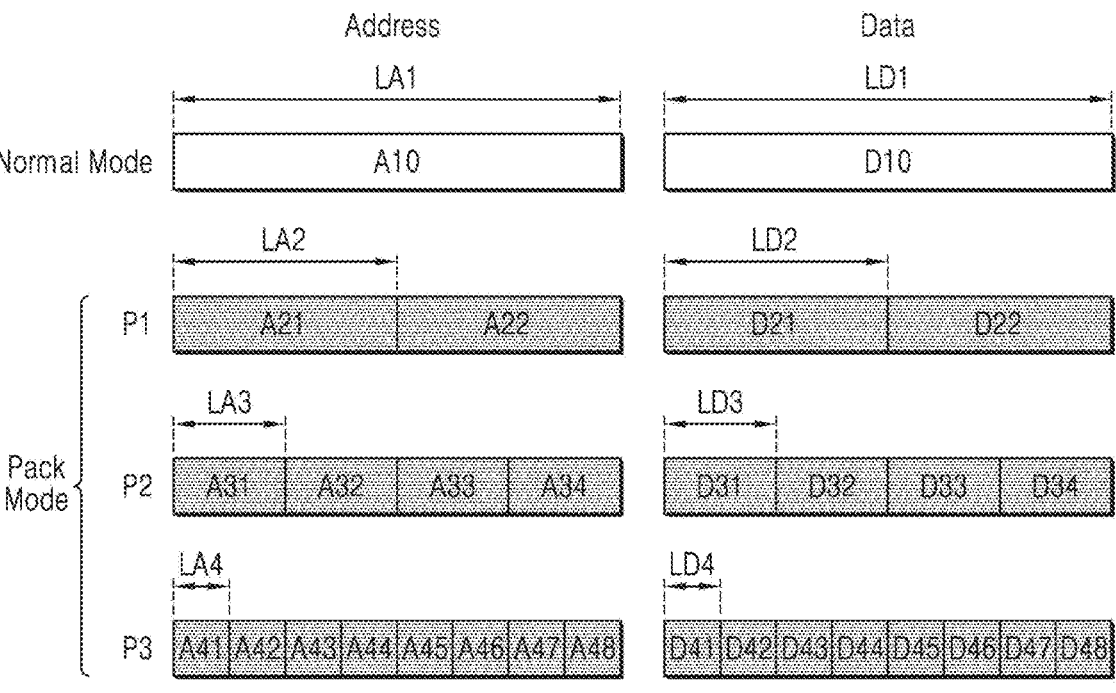
FIG. 3 is a view illustrating examples of addresses and data transmitted and received through the bus, according to an example embodiment.

FIG. 3 is a view illustrating examples of addresses and data transmitted and received through the bus, according to an example embodiment. For example, FIG. 3 illustrates examples of addresses and data of a single transmission transferred through the bus. Herein, a length of the address and a length of the data may refer to the number of bits of the address and the number of bits of the data, respectively. Hereinafter, the descriptions with reference to FIG. 3 are also given with reference to FIG. 2.

Referring to FIG. 3, an address A10 may have a first address length LA1, and data D10 may have a first data length LD1 in the normal mode. As described above with reference to FIG. 1, the first address length LA1 and the first data length LD1 may be relatively long for a high bandwidth, and the bus 220 may have a width corresponding to the first address length LA1 and the first data length LD1.

The bus master 210 may set the pack mode for having access to two or more special function registers in the bus slave 230. For example, the bus master 210 may set a first pack mode P1 for having access to two special function registers, a second pack mode P2 for having access to four special function registers, and a third pack mode P3 for having access to eight special function registers. In some example embodiments, the bus master 210 may also set another pack mode for having access to the number of special function registers different from the number of special function registers shown in FIG. 3.

The address transmitted and received through the bus 220 may include two or more short addresses for having access to two or more special function registers, and the data transmitted and received through the bus 220 may include two or more data units (referred to as two or more values herein). For example, as illustrated in FIG. 3, the address may include two short addresses A21 and A22 corresponding to two special function registers, respectively, and the data may include data units D21 and D22 corresponding to two special function registers, respectively, in the first pack mode P1. The short address may have a second address length LA2, and the second address length LA2 may correspond to half of the first address length LA1. In addition, the data unit may have a second data length LD2, and the second data length LD2 may correspond to half of the first data length LD1. As described above with reference to FIG. 2, the short addresses A21 and A22 may be generated or decoded based on the base address, and the length of the data unit, which is the second data length LD2, may be more than or equal to the length (that is, the number of bits) of the special function register.

In the second pack mode P2, the address may include four short addresses A31 to A34 each having a third address length LA3, and the data may include four data units D31 to D34 each having a third data length LD3. The third address length LA3 may correspond to half of the second address length LA2, and the third data length LD3 may correspond to half of the second data length LD2. In addition, in the third pack mode P3, the address may include eight short addresses A41 to A48 each having a fourth address length LA4, and the data may include eight data units D41 to D48 each having a fourth data length LD4. The fourth address length LA4 may correspond to half of the third address length LA3, and the fourth data length LD4 may correspond to half of the third data length LD3. Hereinafter, the first address length LA1 and the first data length LD1 each being 32 bits are mainly described, but example embodiments of the inventive concepts are not limited thereto.

Figure 4A:
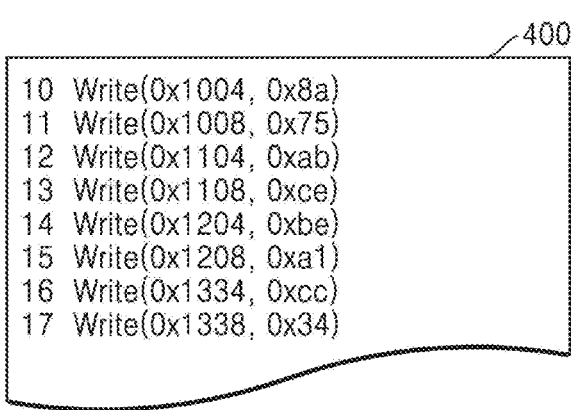
FIGS. 4A and 4B are views illustrating examples of transmission in a pack mode, according to an example embodiment.
Figure 4A:
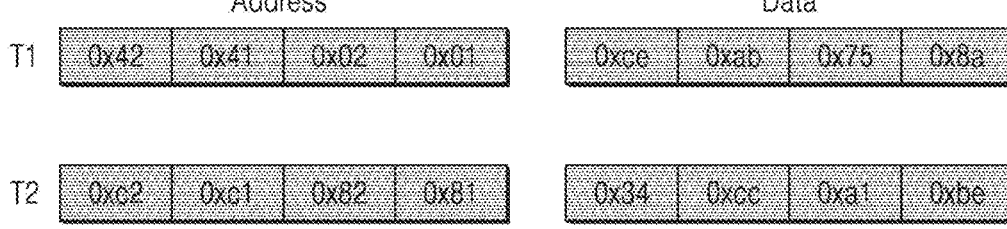
Figure 4B:
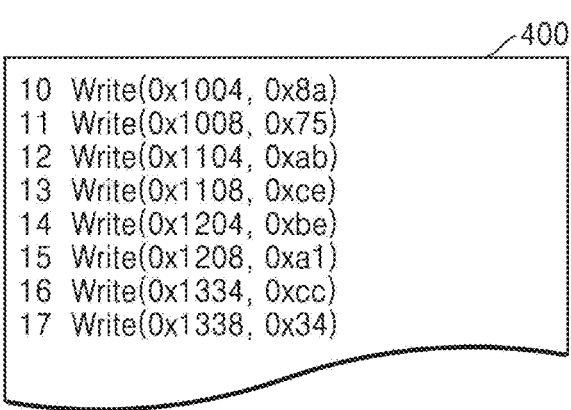
Figure 4B:
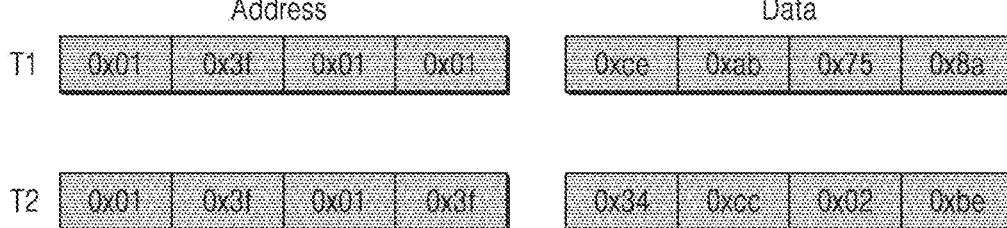

FIGS. 4A and 4B are views illustrating examples of transmission in a pack mode, according to an example embodiment. For example, the processing circuitry 211 in FIG. 2 may execute pseudo code 400 shown in FIGS. 4A and 4B and may set the second pack mode P2 in FIG. 3. Accordingly, the bus interface 212 may generate a first transmission T1 and a second transmission T2 and may transmit the first transmission T1 and the second transmission T2 through the bus 220. In FIGS. 4A and 4B, the base address is assumed to be hexadecimal 1000, that is, 0x1000. Hereinafter, the descriptions with reference to FIGS. 4A and 4B are given together with reference to FIG. 2, and with respect to FIGS. 4A and 4B, redundant descriptions of FIG. 2 are omitted.

Referring to FIG. 4A, the pseudo code 400 may include codes (or instructions) for instructing an access to a plurality of special function registers. For example, the processing circuitry 211 may execute the pseudo code 400 to write hexadecimal values, such as 0x8a and 0x75, to eight special function registers corresponding to absolute addresses, such as 0x1004, 0x1008, etc., and may provide the request for an access to the special function register to the bus interface 212.

In some example embodiments, the bus interface 212 may obtain an address offset by calculating the address difference between the base address and the absolute address and may generate an address including the address offset as the short address. For example, the bus interface 212 may receive an absolute address 0x1004 from the processing circuitry 211 and may obtain the address offset 0x0004, which is a difference between the absolute address 0x1004 and the base address 0x1000. As illustrated in FIG. 4A, the special function registers may be addressed regardless of the lower 2 bits, and accordingly, the bus interface 212 may generate an 8-bit short address 0x01 by shifting the address offset 0x0004 by 2 bits to the right. As illustrated in FIG. 4A, the short address 0x01 may correspond to a lower 8 bit in the address of a first transmission T1. Similarly, the address of the first transmission T1 may include further addresses 0x02, 0x41, and 0x42 sequentially. The data of the first transmission T1 may sequentially include 0x8a, 0x75, 0xab, and 0xce. In addition, the address of a second transmission T2 may sequentially include 0x81, 0x82, 0xc1, and 0xc2, and the data of the second transmission T2 may sequentially include 0xbe, 0xa1, 0xcc, and 0x34.

Referring to FIG. 4B, in some example embodiments, the bus interface 212 may obtain the address offset as a difference between two absolute addresses and may generate an address including the address offset as the short address. For example, the bus interface 212 may generate an initial short address 0x01 from the absolute address 0x1004 as described above with reference to FIG. 4A. The bus interface 212 may obtain the address offset 0x0004 by calculating the difference between the absolute address 0x1004 and the next absolute address 0x1008 and may generate the short address 0x01 by shifting the address offset 0x0004 by 2 bits to the right. Accordingly, as illustrated in FIG. 4B, the address of the first transmission T1 may sequentially include 0x01, 0x01, 0x3f, and 0x01. Similarly, the address of the second transmission T2 may sequentially include 0x3f, 0x01, 0x3f, and 0x01.

Figure 5A:
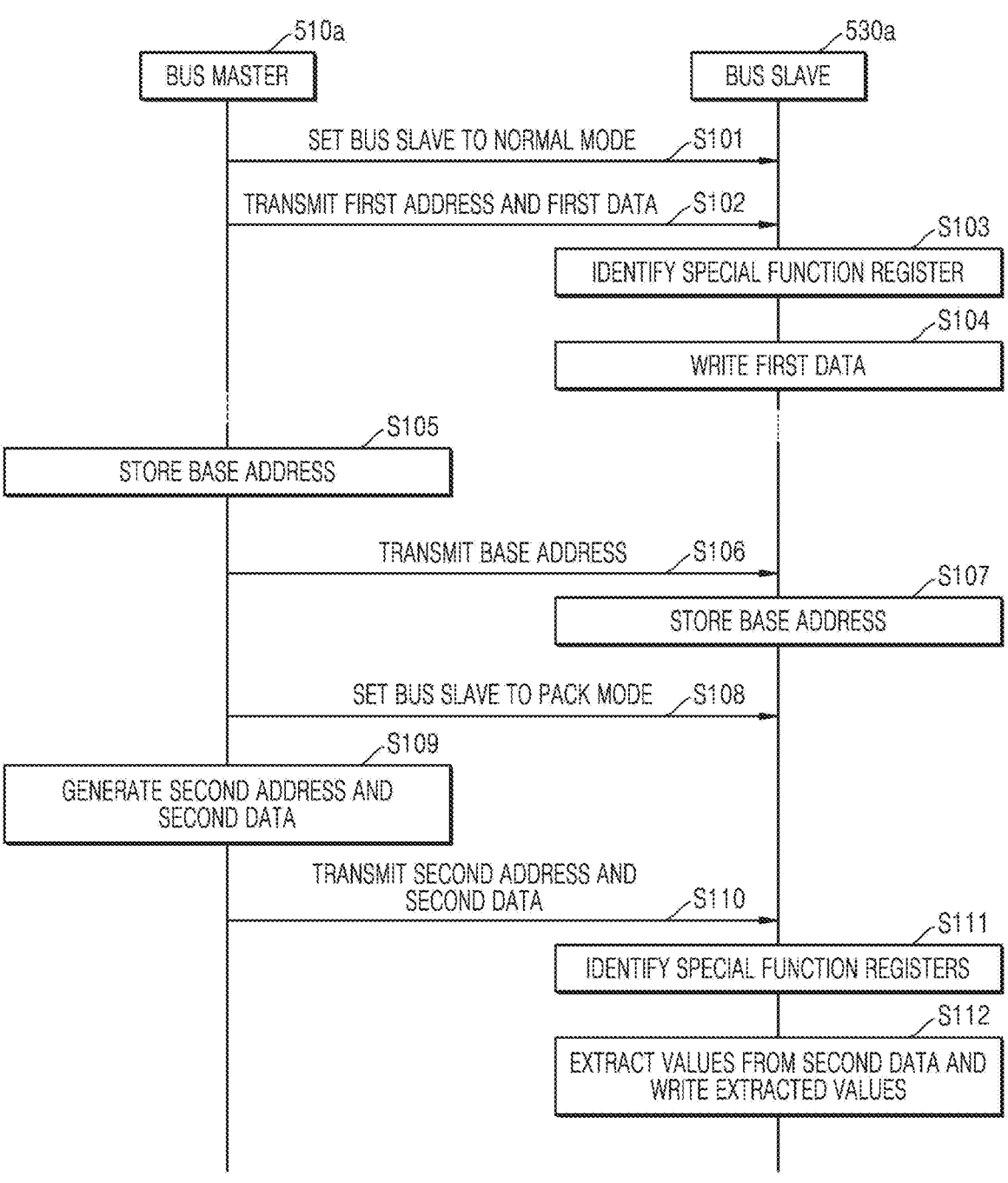
FIGS. 5A and 5B are message diagrams showing a method of performing the adaptive bus protocol, according to an example embodiment.
Figure 5B:
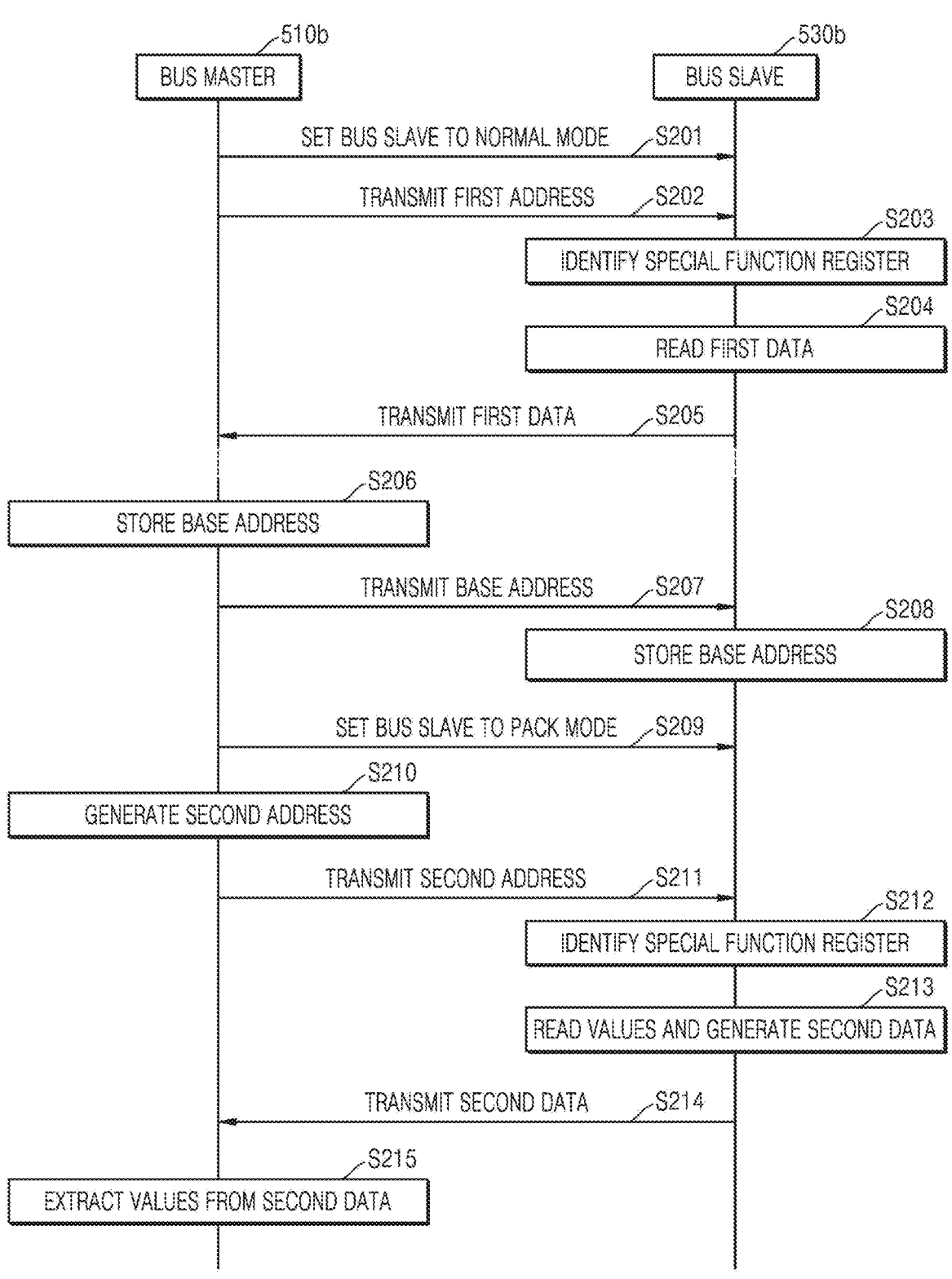

FIGS. 5A and 5B are message diagrams showing a method of performing the adaptive bus protocol, according to an example embodiment. For example, the message diagram of FIG. 5A shows an operation of writing values in the special function registers, and the message diagram of FIG. 5B shows an operation of reading values from the special function registers. Although not shown in FIGS. 5A and 5B, bus masters 510a and 510b and bus slaves 530a and 530b may communicate with each other through a bus. Hereinafter, redundant descriptions of FIGS. 5A and 5B are omitted.

Referring to FIG. 5A, in operation S101, the bus master 510a may set the bus slave 530a to a normal mode. For example, the bus master 510a may transmit a signal for indicating the normal mode to the bus slave 530a through the bus. In some example embodiments, the bus protocol may support a sideband signal, which may be used by a system designer depending on the purpose, such as a HAUSER of an advanced high-performance bus (AHB), a PAUSER of an advanced peripheral bus (APB), and an APUSER or an AWUSER of an advanced extensible interface (AXI), which are not limited thereto, and the signal for indicating the normal mode may be transferred from the bus master 510a to the bus slave 530 through the sideband signal. Accordingly, the adaptive bus protocol may be easily applied to a legacy bus protocol.

In operation S102, the bus master 510a may transmit the first address and the first data to the bus slave 530a. For example, the first address may have an address length (e.g., 32 bits) corresponding to the width of the bus, and the first data may have a data length (e.g., 32 bits) corresponding to the width of the bus. In the normal mode, the first address and the first data may correspond to a single special function register.

The bus slave 530a may identify the special function register in operation S103 and write the first data in the special function register in operation S104. For example, the bus slave 530a may identify the special function register based on the first address that is received in operation S102, and may write the first data, which is received in operation S102, in the identified special function register.

In operation S105, the bus master 510a may store a base address. For example, when having access to two or more special function registers, the bus master 510a may determine the base address based on the absolute addresses of the two or more special function registers and store the determined base address in the base address register (e.g., the BAR1 of FIG. 2).

In operation S106, the bus master 510a may transmit the base address to the bus slave 530a. For example, the bus master 510a may provide a request for writing the base address to the bus slave 530a through the bus. In FIG. 5A, the base address is shown to be transmitted prior to the setting of the pack mode, which is described below, but the base address may also be transmitted after the setting of the pack mode.

In operation S107, the bus slave 530a may store a base address. For example, the bus slave 530a may store the base address, which is received in operation S106, in the base address register (e.g., BAR2 of FIG. 2).

In operation S108, the bus master 510a may set the bus slave 530a to a pack mode. For example, the bus master 510a may transmit a signal for indicating the pack mode to the bus slave 530a through the bus. In some example embodiments, the bus protocol may support the sideband signals, and the signal for indicating the pack mode may be transferred from the bus master 510a to the bus slave 530a through the sideband signal. In some example embodiments, as described above with reference to FIG. 3, a plurality of pack modes may be available, and a signal for indicating one of the plurality of pack modes may be transferred from the bus master 510a to the bus slave 530a.

In operation S109, the bus master 510a may generate a second address and second data. For example, the bus master 510a may generate the second address including two or more short addresses corresponding to two or more special function registers, respectively, as described above with reference to FIGS. 4A and 4B. In addition, the bus master 510a may generate the second data including two or more data units, e.g., two or more values, which are to be written to the two or more special function registers, as described above with reference to FIGS. 4A and 4B. Accordingly, the bus master 510a may set the bus slave 530a early by the second address and the second data.

In operation S110, the bus master 510a may transmit the second address and the second data to the bus slave 530a. For example, the second address may have an address length (e.g., 32 bits) corresponding to the width of the bus, and the second data may have a data length (e.g., 32 bits) corresponding to the width of the bus.

The bus slave 530a may identify the special function registers in operation S111 and may extract and write values from the second data in operation S112. For example, the bus slave 530a may extract two or more short addresses from the second address that is received in operation S110 and may identify two or more special function registers based on two or more short addresses and the base address. In addition, the bus slave 530a may extract two or more values from the second data that is received in operation S110 and write the extracted two or more values to the identified two or more special function registers, respectively.

Referring to FIG. 5B, in operation S201, the bus master 510b may set the bus slave 530b to the normal mode. In operation S202, the bus master 510b may transmit a first address to the bus slave 530b.

The bus slave 530b may identify the special function register in operation S203, read first data in operation S204, and transmit the first data to the bus master 510b in operation S205. For example, the bus slave 530b may identify the special function register based on the first address that is received in operation S202 and may read the first data stored in the identified special function register. The bus slave 530b may transmit the first data to the bus master 510b in response to a read request including the first address.

The bus master 510b may store the base address in operation S206 and may transmit the base address to the bus slave 530b in operation S207. In operation S208, the bus slave 530b may store a base address. In operation S209, the bus master 510b may set the bus slave 530b to the pack mode.

The bus master 510b may generate a second address in operation S210 and may transmit the second address to the bus slave 530b in operation S211. For example, the bus master 510b may generate the second address including two or more short addresses corresponding to two or more special function registers, respectively, as described above with reference to FIGS. 4A and 4B.

The bus slave 530b may identify the special function register in operation S212, read the values in the special function register and generate the second data in operation S213 and transmit the second data to the bus master 510b in operation S214. For example, the bus slave 530b may extract two or more short addresses from the second address that is received in operation S211 and may identify two or more special function registers based on the two or more short addresses and the base address. In addition, the bus slave 530b may read values stored in two or more identified special function registers and generate the second data including the read values.

In operation S215, the bus master 510b may extract values from the second data. For example, the bus master 510b may receive the second data including two or more values, which are read from two or more special function registers, from the bus slave 530b in the pack mode. The bus master 510b may extract two or more values from the second data and may identify the state of the bus slave 530b in advance based on the extracted values.

Figure 6:
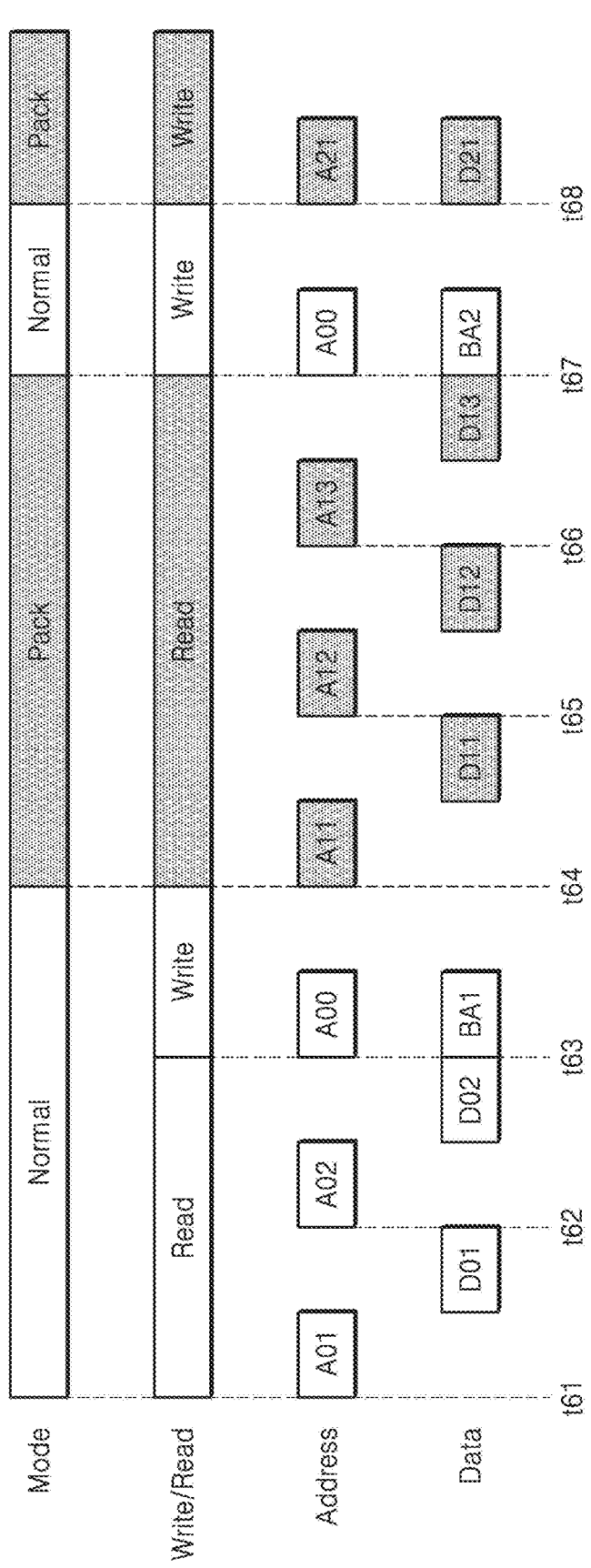
FIG. 6 is a timing diagram showing operations for the adaptive bus protocol, according to an example embodiment.

FIG. 6 is a timing diagram showing operations for the adaptive bus protocol, according to an example embodiment. For example, the timing diagram in FIG. 6 shows the mode, the write/read operation and the address and the data transferred through the bus over time. In some example embodiments, the operations in FIG. 6 may be performed in the system 200 shown in FIG. 2. Hereinafter, the descriptions with reference to FIG. 6 are given together with FIG. 2.

Referring to FIG. 6, the bus master 210 and the bus slave 230 may be set to the normal mode at time t61. From time t61 to time t62, the bus master 210 may transmit address A01 to the bus slave 230 for reading data, and the bus slave 230 may transmit data D01 to the bus master 210. In addition, from time t62 to time t63, the bus master 210 may transmit address A02 to the bus slave 230 for reading data and the bus slave 230 may transmit data D02 to the bus master 210.

The bus master 210 may transmit the address A00 and the first base address BA1 to the bus slave 230 at time t63. The address A00 may indicate the base address register BAR2 in the bus slave 230, and the bus slave 230 may store the first base address BA1 in the base address register BAR2.

At time t64, the bus master 210 and the bus slave 230 may be set to the pack mode. From time t64 to time t65, the bus master 210 may transmit address A11 to the bus slave 230 for reading values from two or more special function registers, and the bus slave 230 may transmit data D11 having the values, which are read from two or more special function registers, to the bus master 210. In addition, from time t65 to time t67, the bus master 210 may transmit address A12 and address A13 to the bus slave 230, respectively, and the bus slave 230 may transmit data D12 and data D13 to the bus master 210, respectively. From time t64 to time t67, the addresses A11, A12, and A13, which are transmitted and received may be generated or decoded based on the first base address BA1 that is transmitted and received at time t63.

At time t67, the bus master 210 and the bus slave 230 may be set to the normal mode. In addition, the bus master 210 may transmit address A00 and the second base address BA2 to the bus slave 230. The bus slave 230 may store the second base address BA2 in the base address register BAR2.

At time t68, the bus master 210 and the bus slave 230 may be set to the pack mode. In addition, the bus master 210 may transmit address A21 and data D21 to the bus slave 230 for writing data D21. Address A21 may be generated or decoded based on the second base address BA2 that is transmitted and received at time t67.

Figure 7:
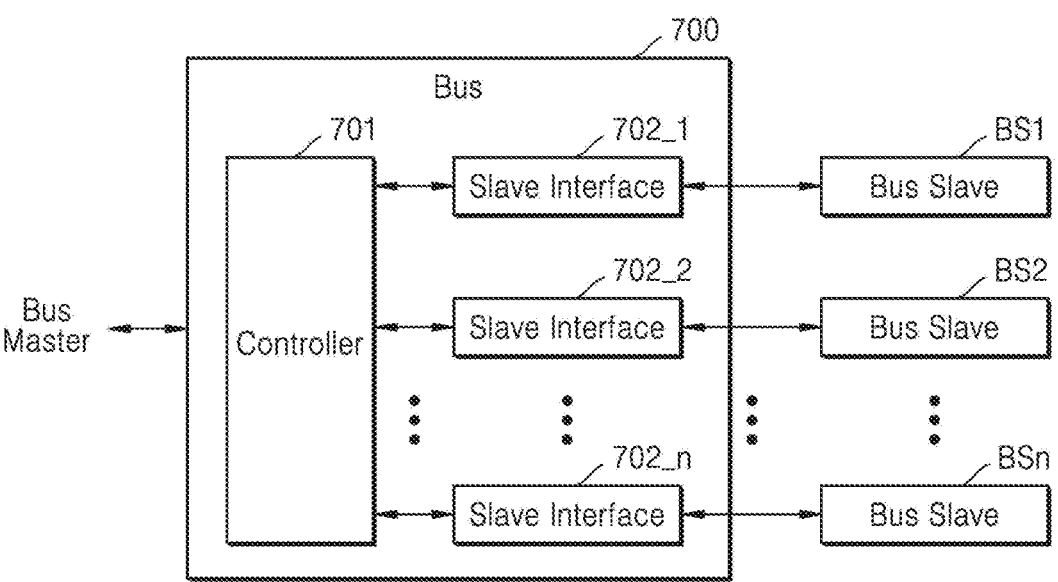
FIG. 7 is a block diagram showing a bus, according to an example embodiment.

FIG. 7 is a block diagram showing a bus 700, according to an example embodiment. As shown in FIG. 7, the bus 700 may be connected to a bus master and may be connected to first to n-th bus slaves BS1 to BSn (n is an integer greater than 1). With respect to FIG. 7, redundant descriptions of FIGS. 1 to 6 are omitted.

Referring to FIG. 7, the bus 700 may include a controller 701 and first to nth slave interfaces 702_1 to 702_*n*. The controller 701 may control the first to nth slave interfaces 702_1 to 702_*n*, and the first to nth slave interfaces 702_1 to 702_*n* may communicate with first to nth bus slaves BS1 to BSn, respectively. Each of (or alternatively, at least one of) the first to nth bus slaves BS1 to BSn may include a plurality of special function registers (or a special function register bank).

The bus 700 may be set to a normal mode or a multi-mode. For example, the bus 700 may be set to the normal mode or the multi-mode depending on a signal that is received from the bus master. As described above with reference to the drawings, in the normal mode, the address and data included in a single transmission may correspond to a single target, e.g., a special function register. In contrast, in the multi-mode, the address and data included in a single transmission may correspond to two or more special function registers. In the multi-mode, the controller 701 may control the first to nth slave interfaces 702_1 to 702_*n* based on the address in the single transmission that is received from the bus master such that two or more special function registers, which are included in at least two of the first to nth bus slaves BS1 to BSn, respectively, are accessed. Accordingly, in the pack mode, as described above with reference to the drawings, two or more special function registers in a single bus slave may be accessed by a single transmission, and in the multi-mode, two or more special function registers respectively included in the two or more bus slaves may be accessed by a single transmission. Examples of addresses and data transmitted and received between the bus master and the bus 700 in the multi-mode are described with reference to FIG. 8.

Figure 8:
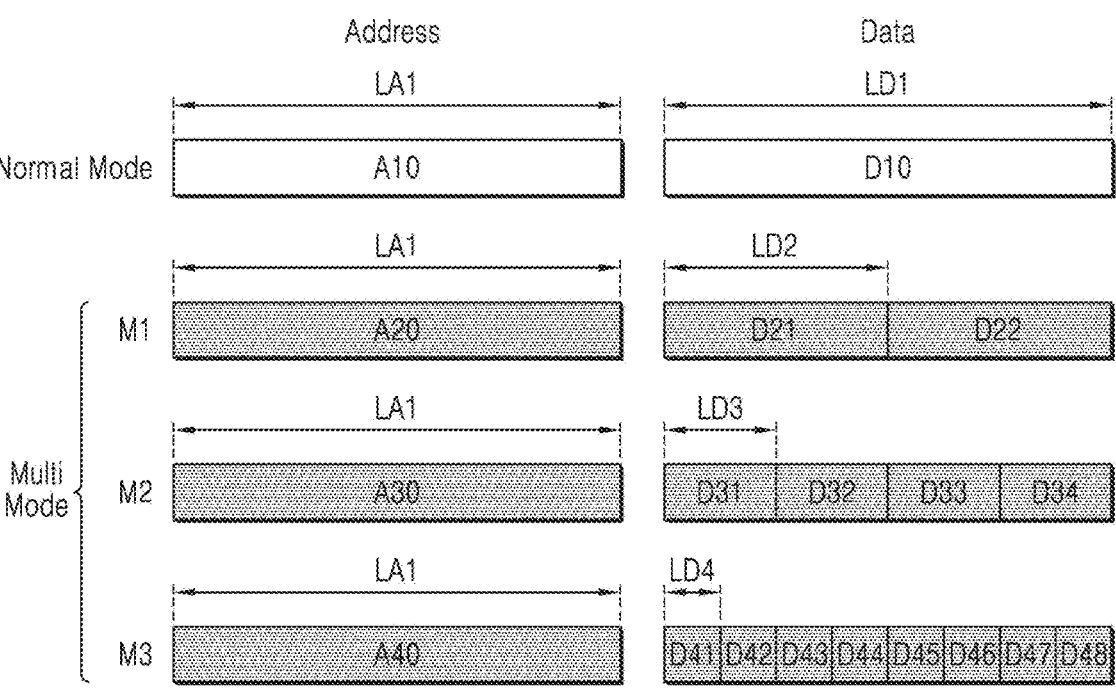
FIG. 8 is a view illustrating examples of address and data transmitted and received through a bus, according to an example embodiment.

FIG. 8 is a view illustrating examples of addresses and data transmitted and received through a bus, according to an example embodiment. FIG. 8 illustrates examples of address and data in a single transmission that is transmitted and received through the bus. Hereinafter, detailed descriptions with reference to FIG. 8 are given together with FIG. 7.

Referring to FIG. 8, in the normal mode, address A10 may have a first address length LA1, and data D10 may have a first data length LD1. As described above with reference to FIG. 1, the first address length LA1 and the first data length LD1 may be relatively long for high bandwidth, and the bus 220 may have a width corresponding to the first address length LA1 and the first data length LD1.

The bus master may set the multi-mode for having access to two or more special function registers that are included in each of (or alternatively, at least one of) the two or more bus slaves, respectively. For example, the first to nth bus slaves BS1 to BSn may have the same special function register map. The bus master may frequently request an operation of writing the same values in two or more special function registers which correspond to the same offset in the first to nth special function register banks of the first to nth bus slaves BS1 to BSn or an operation of reading values from the two or more special function registers. For example, presetting of peripheral component interconnect express (PCIe) may include an operation of setting the same preset value in a plurality of lanes, and backup/recovery of universal flash storage (UFS) may include an operation of backing up/recovering all special function registers corresponding to the plurality of lanes. An individual access to each special function register in the normal mode may significantly reduce the efficiency of the bus 700, however, all special function registers may be accessed by a single transmission in the multi-mode.

The bus master may set a first multi-mode M1 for having access to two special function registers that are included in two bus slaves, respectively, a second multi-mode M2 for having access to four special function registers that are included in four bus slaves, respectively, and a third multi-mode M3 for having access to eight special function registers that are included in eight bus slaves, respectively. In some example embodiments, the bus master may also set a multi-mode for having access to a different number of special function registers from that as shown in FIG. 8.

For having access to two or more special function registers, the addresses transmitted and received through the bus 220 may be common for two or more special function registers and the data transmitted and received through the bus 220 may include two or more data units, that is, two or more values. For example, as illustrated in FIG. 8, in the first multimode M1, address 20 may be common for two special function registers, and the data may include data units D21 and D22 corresponding to two special function registers, respectively. The common address A20 may have a first address length LA1 in the normal mode, and the data unit may have a second data length LD2 corresponding to half of the first data length LD1. The length of the data unit, that is, the second data length LD2, may be greater than or equal to the length (that is, the number of bits) of the special function register.

In the second multi-mode M2, address A30 may be common for four special function registers, and the data may include four data units D31 to D34 corresponding to four special function registers, respectively. The common address A30 may have a first address length LA1 in the normal mode, and the data unit may have a third data length LD3 corresponding to half of the second data length LD2. In the third multi-mode M3, address A40 may be common for eight special function registers, and the data may include eight data units D41 to D48 corresponding to eight special function registers, respectively. The common address A40 may have a first address length LA1 in the normal mode, and the data unit may have a fourth data length LD4 corresponding to half of the third data length LD3.

Figure 9A:
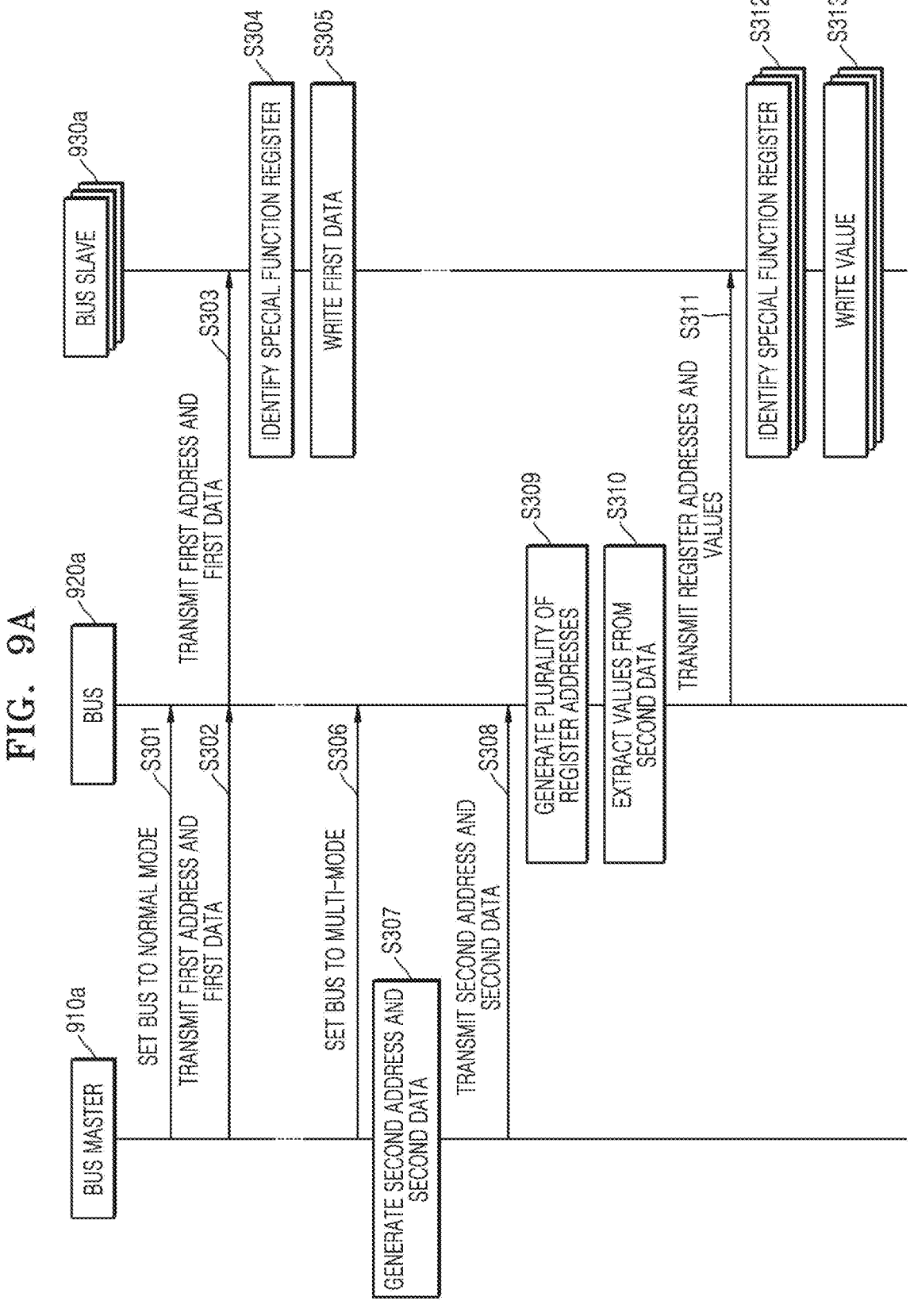
FIGS. 9A and 9B are message diagrams showing a method of performing the adaptive bus protocol, according to an example embodiment.
Figure 9B:
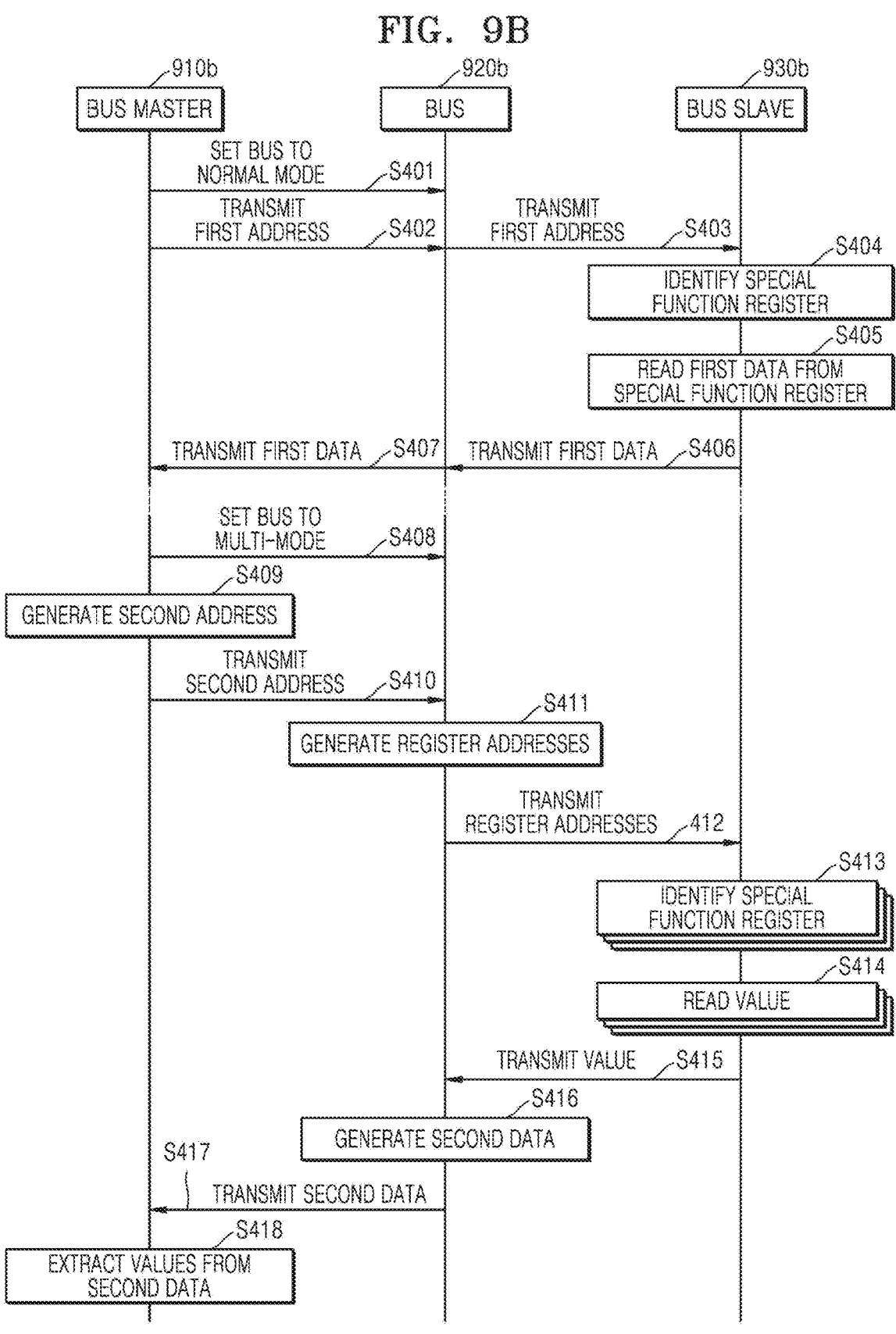

FIGS. 9A and 9B are message diagrams showing a method of performing the adaptive bus protocol, according to an example embodiment. For example, the message diagram of FIG. 9A shows an operation of writing values in the special function registers, and the message diagram of FIG. 9B shows an operation of reading values from the special function registers. Hereinafter, redundant descriptions of FIGS. 9A and 9B and redundant descriptions of FIGS. 1 to 8 are omitted.

Referring to FIG. 9A, in operation S301, a bus master 910a may set a bus 920a to a normal mode. For example, the bus master 910a may transmit a signal for indicating the normal mode to the bus 920a. In some example embodiments, the bus protocol may support a sideband signal, and the signal for indicating the normal mode may be provided to the bus 920a through the sideband signal.

In operation S302, the bus master 910a may transmit the first address and the first data to the bus 920a, and in operation S303, the bus 920a may transmit the first address and the first data to bus slaves 930a. For example, the first address may have an address length (e.g., 32 bits) corresponding to a width of the bus, and the first data may have a data length (e.g., 32 bits) corresponding to a width of the bus. In the normal mode, the first address and the first data may correspond to a single special function register in a single bus slave.

One of the bus slaves 930a may identify the special function register in operation S304 and may write the first data in the special function register in operation S305. For example, one of the bus slaves 930a may identify the special function register based on the first address that is received in operation S303 and may write the first data that is received in operation S303 in the identified special function register.

In operation S306, the bus master 910a may set the bus 920a to a multi-mode. For example, the bus master 910a may transmit a signal for indicating the multi-mode to the bus 920a. In some example embodiments, the bus protocol may support sideband signals, and the signal for indicating the multi-mode may be provided from the bus master 910a to the bus 920a through the sideband signal. In some example embodiments, as described above with reference to FIG. 8, a plurality of multi-modes may be available, and the signal for indicating one of the plurality of multi-modes may be provided from the bus master 910a to the bus 920a.

In operation S307, the bus master 910a may generate a second address and second data. For example, the bus master 910a may generate a second address common for the special function registers and may generate the second data having two or more values to be written in the special function registers, as described above with reference to FIG. 8. Accordingly, the bus master 910a may set the bus slaves 930a early by the second address and the second data.

In operation S308, the bus master 910a may transmit the second address and the second data to the bus 920a. For example, the second address may have an address length (e.g., 32 bits) corresponding to a width of the bus, and the second data may have a data length (e.g., 32 bits) corresponding to a width of the bus.

The bus 920a may generate a plurality of register addresses in operation S309 and may extract values from the second data in operation S310. For example, the bus 920a (or the controller 701 in FIG. 7) may generate two or more register addresses that are to be transmitted to the bus slaves 930a from the second address that is received in operation S308. In some example embodiments, the generated register addresses may be the same as the second address. In addition, the bus 920a (or the controller 701 of FIG. 7) may extract values from the second data that is received in operation S308. Herein, an operation in which the bus 920a generates register addresses from the second address and extracts values from the second data may be referred to as forking one transmission into two or more transmissions.

In operation S311, the bus 920a may transmit register addresses and values to the bus slaves 930a. For example, each of (or alternatively, at least one of) the bus interfaces in the bus 920a may receive the register address generated in operation S309 and the value extracted in operation S310 and may transmit the register address and the value to the bus slave connected thereto. In some example embodiments, the register addresses may be transmitted in parallel to the bus slaves 930a, and the values may also be transmitted in parallel to the bus slaves 930a.

Each of (or alternatively, at least one of) the bus slaves 930a may identify a special function register in operation S312 and write a value in operation S313. For example, each of (or alternatively, at least one of) the bus slaves 930a may identify a special function register based on the register address received in operation S311 and write the value received in operation S311 in the identified special function register. In some example embodiments, operation S312 may be performed in parallel in the bus slaves 930a, and operation S313 may also be performed in parallel in the bus slaves 930a.

Referring to FIG. 9B, a bus master 910b may set a bus 920b to the normal mode in operation S401 and may transmit a first address to the bus 920b in operation S402. In operation S403, the bus 920b may transmit the first address to bus slaves 930b.

One of the bus slaves 930b may identify a special function register in operation S404 and may read the first data in operation S405. For example, one of the bus slaves 930b may identify the special function register based on the first address received in operation S403 and may read a value stored in the identified special function register. In operation S406, the bus slaves 930b may transmit the first data to the bus 920b. In operation S407, the bus 920b may transmit the first data to the bus master 910b.

In operation S408, the bus master 910b may set the bus 920b to a multi-mode. For example, the bus master 910b may transmit a signal for indicating the multi-mode to the bus 920b. In some example embodiments, the bus protocol may support sideband signals, and the signal for indicating the multi-mode may be provided to the bus 920b from the bus master 910b through the sideband signal.

The bus master 910b may generate a second address in operation S409 and may transmit the second address to the bus 920b in operation S410. For example, the bus master 920b may generate the second address common for the special function registers, as described above with reference to FIG. 8.

In operation S411, the bus 920b may generate register addresses. For example, the bus 920b (or the controller 701 in FIG. 7) may generate two or more register addresses that are to be transmitted to the bus slaves 930b from the second address that is received in operation S410. In some example embodiments, the generated register addresses may be the same as the second address. Herein, an operation in which the bus 920b generates register addresses from the second address may be referred to as forking one transmission into two or more transmissions.

In operation S412, the bus 920b may transmit register addresses to the bus slaves 930b. For example, each of (or alternatively, at least one of) the bus interfaces in the bus 920b may receive the register address generated in operation S411 and may transmit the register address to the bus slave connected thereto. In some example embodiments, the register addresses may be transmitted in parallel to the bus slaves 930b.

Each of (or alternatively, at least one of) the bus slaves 930*b* may identify a special function register in operation S413 and may read a value in operation S414. For example, each of (or alternatively, at least one of) the bus slaves 930*b* may identify a special function register based on the register address received in operation S412 and may read a value stored in the identified special function register. In some example embodiments, operation S413 may be performed in parallel in the bus slaves 930*b*, and operation S414 may also be performed in parallel in the bus slaves 930*b*.

In operation S415, the bus slaves 930*b* may transmit values to the bus 920*b*. For example, each of (or alternatively, at least one of) the bus slaves 930*b* may transmit the value, which is read in operation S414, to the bus 920*b*. In some example embodiments, the values may be transmitted in parallel to the bus 920*b*.

The bus 920*b* may generate the second data in operation S416 and may transmit the second data to the bus master 910*b* in operation S417. For example, the bus 920*b* (or the controller 701 of FIG. 7) may generate the second data including the values received in operation S415. The bus 920*b* may transmit the second data to the bus master 910*b* in response to a write request including the second address. Herein, an operation in which the bus 920*b* generates the second data from the values may be referred to as a join of a plurality of transmissions, which are received from the bus slaves 930*b*, into a single transmission.

In operation S418, the bus master 910*b* may extract the values from the second data. For example, the bus master 910*b* may receive the second data including the values, which are read from the special function registers, from the bus 920*b* in the multi-mode. The bus master 910*b* may extract the values from the second data and simultaneously (or alternatively, contemporaneously) check states of the bus slaves 930*b* based on the extracted values.

FIG. 10 is a timing diagram showing an operation of performing an adaptive bus protocol, according to an example embodiment. For example, the timing diagram in FIG. 10 shows the mode, the write/read operation, the address and the data between the bus master and the bus, and the address and the data between the bus and the four bus slaves over time. In some example embodiments, the operation of FIG. 10 may be performed by the bus 700 and the first to nth bus slaves BS1 to BSn in FIG. 7. Hereinafter, the descriptions on the operation of FIG. 10 are given with reference to FIG. 7.

Referring to FIG. 10, the bus master and the bus 700 may be set to the normal mode. From time t11 to time t12, the bus master may transmit address A01 to the bus 700 for reading data from the first bus slave BS1, and the bus 700 may transmit the address A01 to the first bus slave BS1. The first bus slave BS1 may transmit data D01 to the bus 700 in response to the address A01, and the bus 700 may transmit the data D01 to the bus master. From time t12 to time t13, the bus master may transmit address A02 to the second bus slave BS2 for reading data from the second bus slave BS2. The second bus slave BS2 may transmit data D02 to the bus 700 in response to the address A02, and the bus 700 may transmit the data D02 to the bus master. From time t13 to time t14, the bus master may transmit address A03 and data D03 to the bus 700 for writing the data D03 in the third bus slave BS3, and the bus 700 may transmit the address A03 and the data D03 to the third bus slave BS3.

At time t14, the bus master and the bus 700 may be set to the multi-mode, for example, the second multi-mode M2 in FIG. 8. From time t14 to time t15, the bus master may transmit address A11 to the bus 700 for reading data from the special function registers of the first to fourth bus slaves BS1 to BS4. The bus 700 may generate register addresses A111 to A114 from the address A11 and transmit the register addresses A111 to A114 to the first to fourth bus slaves BS1 to BS4, respectively. The first to fourth bus slaves BS1 to BS4 may transmit first to fourth data units D111 to D114 to the bus 700, and the bus 700 may generate data D11 from the first to fourth data units D111 to D114 and transmit the data D11 to the bus master.

At time t15, the bus master may transmit address A21 and data D21 to the bus 700 for writing the data D21 to the special function registers of the first to fourth bus slaves BS1 to BS4. The bus 700 may generate register addresses A211 to A214 from the address A21 and transmit the register addresses to the first to fourth bus slaves BS1 to BS4, respectively. In addition, the bus 700 may transmit data units D211 to D214, which are extracted from the data D21, to the first to fourth bus slaves BS1 to BS4, respectively.

Figure 11:
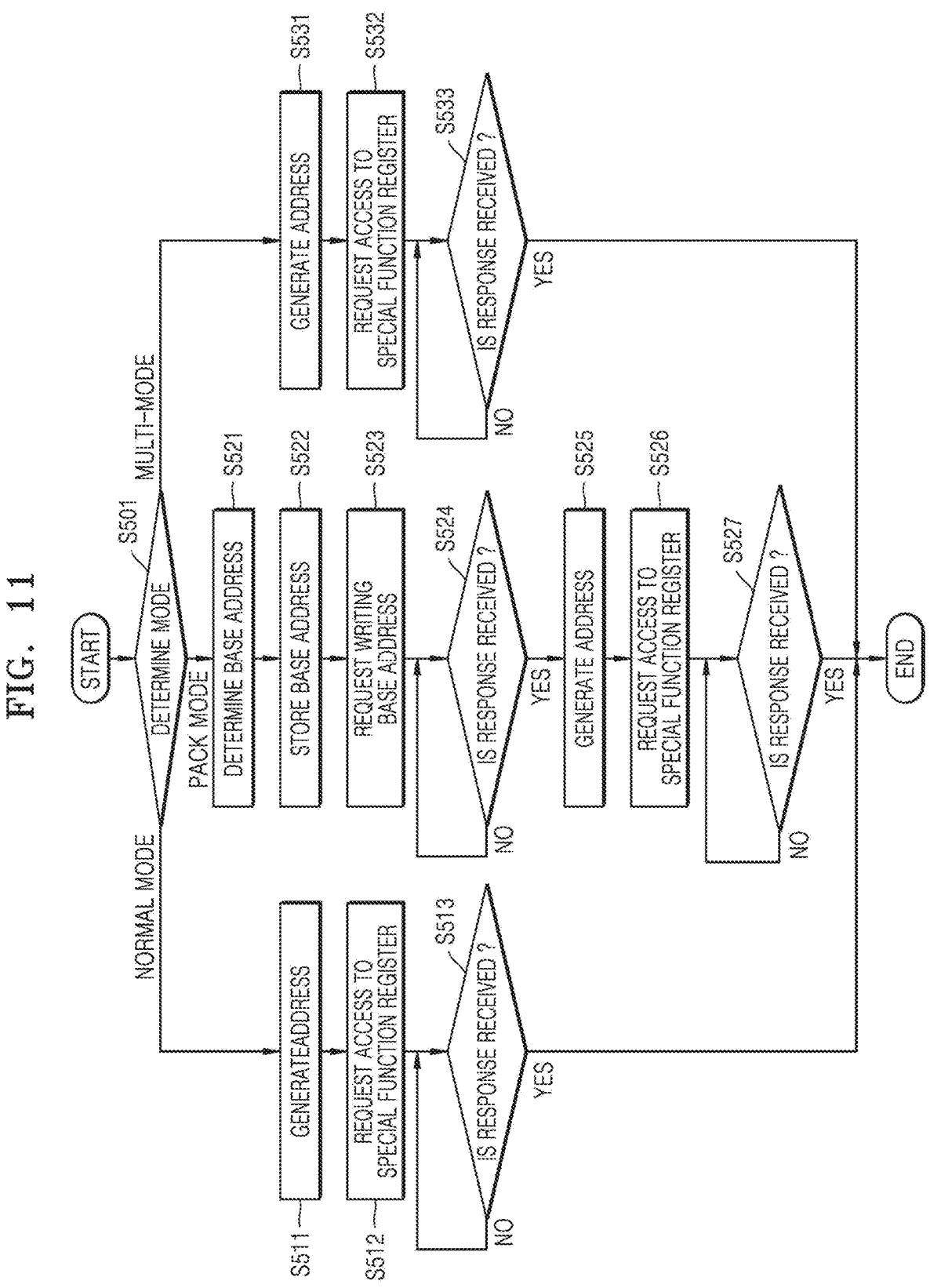
FIG. 11 is a flowchart showing an operation of the bus master, according to an example embodiment.

FIG. 11 is a flowchart showing an operation of the bus master, according to an example embodiment. In some example embodiments, the operation of FIG. 11 may be performed by the bus master 111 shown in FIG. 1. Hereinafter, the descriptions with reference to FIG. 11 are given together with reference to FIG. 1.

Referring to FIG. 11, a mode may be determined in operation S501. For example, the bus master 111 may determine the mode depending on a special function register that is to be accessed. In some example embodiments, when an access to the single special function register is required (or alternatively, desired), the normal mode may be determined, and operations S511 to S513 may be subsequently performed. In some example embodiments, when an access to two or more special function registers in a single bus slave is required (or alternatively, desired), a pack mode may be determined, and operations S521 to S527 may be subsequently performed. In some example embodiments, when an access to two or more special function registers in two or more bus slaves, respectively, is required (or alternatively, desired), a multi-mode may be determined to be set, and operations S531 to S533 may be subsequently performed.

When the normal mode is determined, an address may be generated in operation S511. For example, the bus master 111 may generate the address for having access to the special function register in the bus slave 124. In some example embodiments, the bus master 111 may additionally generate data that is to be written in the special function register. In operation S512, an access to the special function register may be requested. For example, the bus master 111 may transmit an access request including the address generated in operation S511 to the bus slave 124 through the bus 120. In some example embodiments, the access request may further include data to be written in the special function register. In operation S513, the bus master may determine whether a response to the access request is received, and then when the response is received from the bus slave 124 through the bus 120, the bus master may terminate the operation of FIG. 11, as shown in FIG. 11.

In addition, when the pack mode is determined, a base address may be determined in operation S521. For example, the bus master 111 may determine the base address based on absolute addresses of two or more special function registers that is to be accessed. In operation S522, the base address may be stored. For example, the bus master 111 may store the base address, which is determined in operation S521, in the base address register. In operation S523, writing of the base address may be requested. For example, the bus master 111 may transmit a request for writing the base address to the bus slave 124 through the bus 120, to share the base address stored in the base address register with the bus slave 124 in operation S522. In operation S524, the bus master may determine whether a response to the write request is received, and then when the response is received from the bus slave 124 through the bus 120, the bus master may perform a subsequent operation S522, as shown in FIG. 11.

In operation S525, an address may be generated. For example, the bus master 111 may generate short addresses, which corresponds to two or more special function registers that are to be accessed, respectively, based on the base address. In some example embodiments, the bus master 111 may additionally generate two or more data units which are to be written in two or more special function registers, respectively. In operation S526, an access to the special function register may be requested. For example, the bus master 111 may transmit an access request including the address, which is generated in operation S522, to the bus slave 124 through the bus 120. In some example embodiments, the access request may include data including two or more data units that are to be written in two or more special function registers. In operation S527, the bus master may determine whether a response to the access request is received, and then when the response is received from the bus slave 124 through the bus 120, the bus master may terminate the operation of FIG. 11, as shown in FIG. 11.

When the multi-mode is determined, an address may be generated in operation S531. For example, the bus master 111 may generate a common address for having access to two or more special function registers that are included in two or more bus slaves, respectively. In some example embodiments, the bus master 111 may additionally generate two or more data units that are to be written in two or more special function registers, respectively. In operation S532, an access to a special function register may be requested. For example, the bus master 111 may transmit an access request, which includes the address generated in operation S531, to the bus 120. In some example embodiments, the access request may include data including two or more data units that are to be written in two or more special function registers. In operation S533, the bus master may determine whether a response to the access request is received, and then when the response is received from the bus slave 124 through the bus 120, the bus master may terminate the operation of FIG. 11, as shown in FIG. 11.

Figure 12:
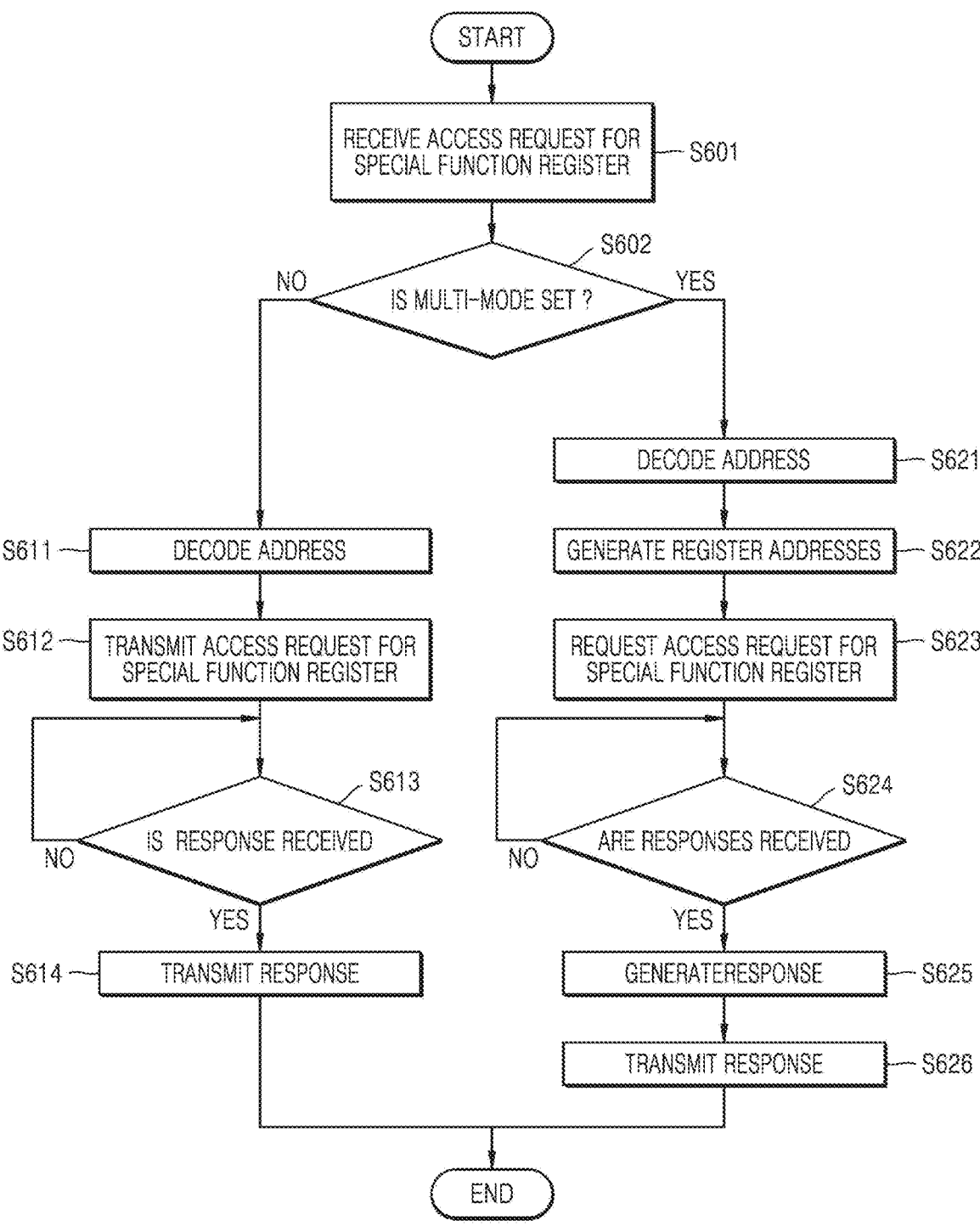
FIG. 12 is a flowchart showing an operation of the bus master, according to an example embodiment.

FIG. 12 is a flowchart showing an operation of the bus master, according to an example embodiment. In some example embodiments, the operation of FIG. 12 may be performed by the bus 120 shown in FIG. 1. Hereinafter, the descriptions with reference to FIG. 12 are given together with reference to FIG. 1.

Referring to FIG. 12, in operation S601, a request for an access (referred to as access request) to the special function register may be received. For example, the bus 120 may receive the access request (e.g., write request or read request) for the special function register from the bus master 111.

In operation S602, the mode of the bus 120 may be determined whether or not the multi-mode is. For example, the bus 120 may be preset to the normal mode or the multi-mode by the bus master 111. As shown in FIG. 12, when the bus 120 is preset to the normal mode, operations S611 to S614 may be subsequently performed, however, when the bus 120 is preset to the multi-mode, operations S621 to S626 may be subsequently performed.

When the bus 120 is set to the normal mode, an address may be decoded in operation S611. For example, the bus 120 may decode the address in the access request that is received in operation S601. In some example embodiments, the bus 120 may identify the bus slave 124 based on the decoded address. In operation S612, the access request for the special function register may be transmitted. For example, the bus 120 may transmit the access request for the special function register including the address, which is decoded in operation S611, to the bus slave 124. In operation S613, the bus 120 may determine whether a response to the access request is received, and then when the response is received from the bus slave 124, operation S614 may be subsequently performed, as shown in FIG. 12. In operation S614, a response may be transmitted. For example, when the response is received from the bus slave 124, the bus 120 may transmit the response to the bus master 111. In some example embodiments, when the read request is received as the access request in operation S601, the response may include the read data.

When the bus 120 is set to the multi-mode, an address may be decoded in operation S621. For example, the bus 120 may decode the address included in the access request received in operation S601. In some example embodiments, the bus 120 may identify two or more bus slaves each including a special function register, which is to be accessed, based on the decoded address. In operation S622, a plurality of register addresses may be generated. For example, the access request, which is received in operation S601, may include a common address for two or more special function registers, and the bus 120 may generate the register addresses, which are to be provided to two or more bus slaves, respectively, from the common address. In some example embodiments, when the write request is received as the access request in operation S601, the bus 120 may generate data units, which are to be provided to two or more bus slaves, respectively, from the data in the access request.

In operation S623, the access to the special function registers may be requested. For example, the bus 120 may transmit two or more access requests to two or more bus slaves. In operation S624, the bus 120 may determine whether a response to the access request is received. For example, the bus 120 may receive a plurality of responses to two or more access requests, and when all responses are received, operation S625 may be performed. The bus 120 may generate a response in operation S625 and may transmit the response in operation S626. For example, the bus 120 may join all the responses received in operation 624 to generate a response for transmitting to the bus master 111, and then may transmit the response to the bus master 111.

Figure 13:
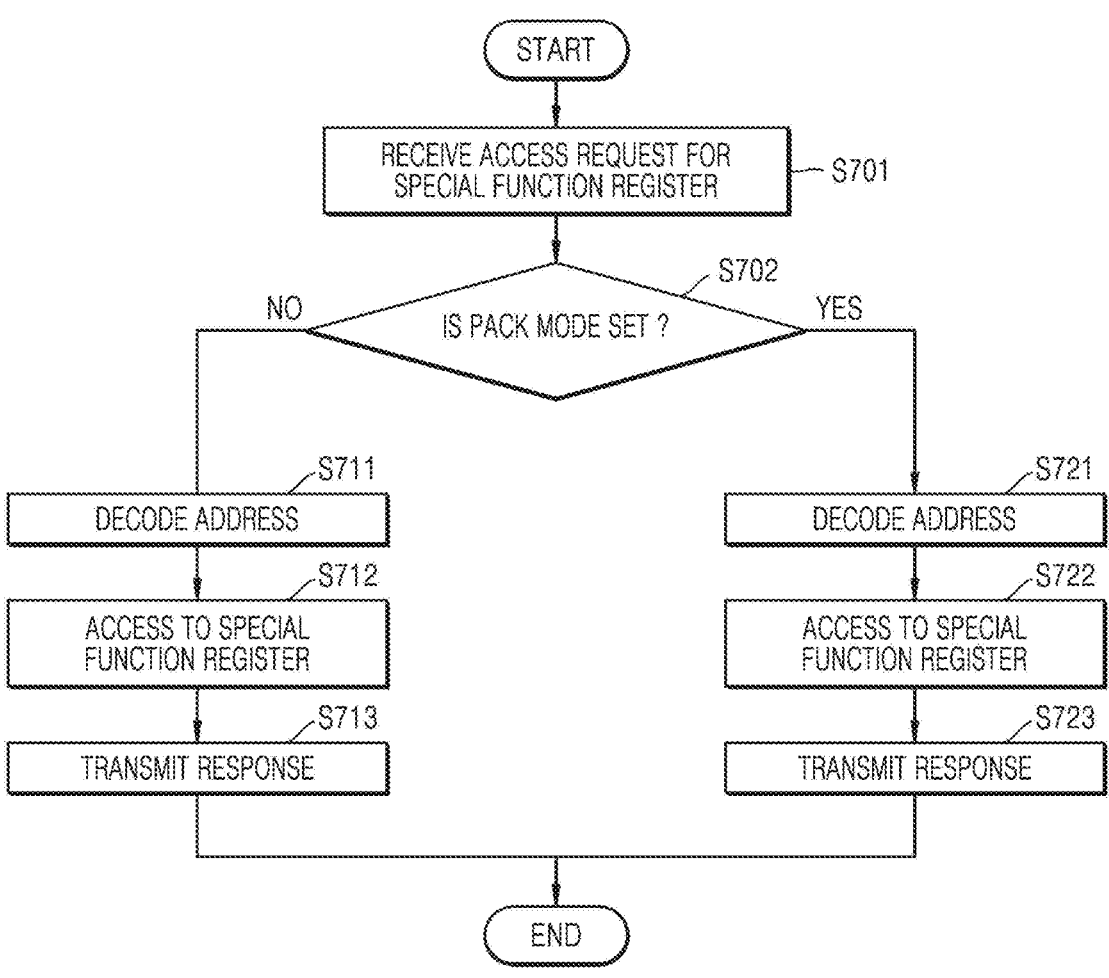
FIG. 13 is a flowchart showing an operation of the bus slave, according to an example embodiment.

FIG. 13 is a flowchart showing an operation of the bus slave, according to an example embodiment. In some example embodiments, the operation of FIG. 13 may be performed by the bus slave 124 shown in FIG. 1. Hereinafter, the descriptions with reference to FIG. 13 are given together with reference to FIG. 1.

Referring to FIG. 13, in operation S701, a request for an access (referred to as access request) to the special function register may be received. For example, the bus slave 124 may receive the access request (e.g., write request or read request) for the special function register from the bus 120.

In operation S702, the mode of the bus slave 124 may be determined whether or not the pack mode is. For example, the bus slave 124 may be preset to the normal mode or the pack mode by the bus master 111. As shown in FIG. 13, when the bus slave 124 is preset to the normal mode, operations S711 to S713 may be subsequently performed, however, when the bus slave 120 is preset to the pack mode, operations S721 to S723 may be subsequently performed.

When the bus slave 124 is set to the normal mode, the address may be decoded in operation S711. For example, the bus slave 124 may decode the address in the access request that is received in operation S701. In some example embodiments, the bus slave 124 may identify the special function register based on the decoded address. In some example embodiments, when the write request is received as the access request, the data in the access request may be additionally decoded. In operation S712, the special function register may be accessed. For example, the register controller in the bus slave 124 may have access to the special function register that is identified based on the address decoded in operation S711. In operation S713, the bus slave 124 may transmit a response to the access request. For example, the bus slave 124 may generate a response to the access request for the special function register and may transmit the response to the bus master 111 through the bus 120. In some example embodiments, when the read request is received as the access request in operation S701, the response may include a value that is read from the special function register.

When the bus slave 124 is set to the pack mode, an address may be decoded in operation S721. For example, the bus slave 124 may decode the address in the access request that is received in operation S701. The address received in the pack mode may include two or more short addresses, and the bus slave 124 may decode short addresses based on the base address. In some example embodiments, when the write request is received as the access request, the data in the access request may include two or more data units, and the bus slave 124 may extract the data units from the access request. In operation S722, the special function registers may be accessed. For example, the register controller included in the bus slave 124 may have access to two or more special function registers that are identified based on the short addresses decoded in operation S721. In operation S723, the bus slave 124 may transmit a response to the access request. For example, the bus slave 124 may generate a response to the access request for the special function registers and may transmit the response to the bus master 111 through the bus 120. In some example embodiments, when the read access is received as the access request in operation S701, the response may include two or more values that are read from two or more special function registers.

Any of the elements and/or functional blocks disclosed above may include or be implemented in processing circuitry such as hardware including logic circuits; a hardware/software combination such as a processor executing software; or a combination thereof. For example, the controller 215, controller 235, and register controller 232, may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Example embodiments have been disclosed in drawings and specifications as described above. Example embodiments have been described by using specific terms in this specification, but they are used only for the purpose of describing the technical idea of the disclosure and are not used to limit the scope of the disclosure described in meaning or claims. Therefore, those skilled in the art will understand that various modifications and equal other example embodiments are possible therefrom. Therefore, the true scope of technical protection of the present disclosure should be determined by the technical idea of the appended claims.

While the inventive concepts have been particularly shown and described with reference to example embodiments thereof, it will be understood that various changes in form and details may be made therein without departing from the spirit and scope of the following claims.

What is claimed is:

1. An apparatus comprising:
a bus master including,
    processing circuitry configured to,
        dynamically set a mode to a first mode when accessing a single special function register, and to a second mode when accessing a plurality of special function registers, and
        control operation of the bus master such that the bus master transmits a first address corresponding to the single special function register to a bus slave through a bus in the first mode and to transmit a second address having a same first length as the first address and corresponding to the plurality of special functions registers to the bus slave through the bus in the second mode; and
    a bus interface configured to, in the second mode, generate the second address such that the second address includes a plurality of short addresses corresponding to the plurality of special function registers of the bus slave, respectively.

2. The apparatus of claim 1, wherein
the processing circuitry is configured to control operation of the bus master such that the bus master transmits or receives first data through the bus in the first mode and to transmit or receive second data through the bus in the second mode, and
the second data has a same second length as the first data and includes a plurality of first values corresponding to the plurality of special function registers, respectively.

3. The apparatus of claim 1, wherein
the bus interface includes a first base address register configured to store a base address, and
the bus interface is further configured to generate a plurality of address offsets as the plurality of short addresses based on the base address and a plurality of absolute addresses of the plurality of special function registers in the second mode.

4. The apparatus of claim 3, wherein
the bus master is further configured to transmit the base address to the bus slave through the bus.

5. The apparatus of claim 4, further comprising:
the bus; and
the bus slave,
wherein the bus slave includes the plurality of special function registers, a second base address register configured to store the base address and a register controller configured to identify the plurality of special function registers based on the base address and the plurality of short addresses in the second mode.

6. The apparatus of claim 5, wherein
the register controller is further configured to generate third data and to transmit the third data to the bus master through the bus in the second mode, and
the register controller is configured to generate the third data based on information received from the plurality of special function registers.

7. The apparatus of claim 1, wherein
the plurality of special function registers include a first special function register having a first absolute address and a second special function register having a second absolute address, and
the bus interface is further configured to generate the second address including a difference between the first absolute address and the second absolute address.

8. The apparatus of claim 1, wherein
the processing circuitry is further configured to control operation of the bus master such that the bus master transmits a mode signal indicating the first mode or the second mode to the bus slave through the bus.

9. The apparatus of claim 8, wherein
the mode signal is a sideband signal of the bus.

10. A method comprising:
dynamically setting a mode to a first mode when accessing a single special function register, and to a second mode when accessing a plurality of special function registers;
transmitting a first address corresponding to the single special function register to a bus slave through a bus in the first mode;
generating a second address corresponding to the plurality of special functions registers in the second mode such that the second address includes a plurality of short addresses corresponding to the plurality of special function registers of the bus slave, respectively, and has a same first length as the first address; and
transmitting the second address to the bus slave through the bus in the second mode.

11. The method of claim 10, further comprising:
transmitting first data to the bus slave through the bus in the first mode;
generating second data in the second mode such that the second data includes a plurality of first values corresponding to the plurality of special function registers, respectively, and has a same second length as the first data; and
transmitting the second data to the bus slave through the bus in the second mode.

12. The method of claim 10, further comprising:
receiving first data from the bus slave through the bus in the first mode;
receiving second data from the bus slave through the bus in the second mode; and extracting a plurality of second values corresponding to the plurality of special function registers, respectively, from the second data in the second mode.

13. The method of claim 10, further comprising:
determining a base address based on a plurality of absolute addresses of the plurality of special function registers in the second mode,
wherein the generating the second address includes generating a plurality of address offsets based on the base address and the plurality of absolute addresses.

14. The method of claim 13, further comprising:
transmitting the base address to the bus slave through the bus.

15. An apparatus comprising:
a bus configured to receive a first address from a bus master in a first mode and a second address having a same first length as the first address from the bus master in a second mode,
wherein the bus includes
a plurality of slave interfaces configured to communicate with a plurality of bus slaves, respectively; and
a controller configured to control the plurality of slave interfaces to have access to a plurality of special function registers based on the second address in the second mode, each of the plurality of bus slaves including one of the plurality of special function registers.

16. The apparatus of claim 15, wherein
the bus is further configured to receive first data from the bus master in the first mode and to receive second data, which has a same second length as the first data, from the bus master in the second mode, and
the controller is further configured to extract a plurality of first values corresponding to the plurality of special function registers, respectively, from the second data and to provide the extracted values to the plurality of slave interfaces, respectively, in the second mode.

17. The apparatus of claim 16, wherein
the bus master is further configured to generate the second address based on the plurality of special function registers and the second data including the plurality of first values, and to transmit the second address and the second data to the bus in the second mode.

18. The apparatus of claim 15, wherein
the controller is further configured to generate third data including a plurality of second values, which are received from the plurality of slave interfaces, respectively, and to transmit the third data to the bus master in the second mode.

19. The apparatus of claim 15, wherein
the bus is further configured to receive a mode signal indicating the first mode or the second mode from the bus master through the bus.

20. The apparatus of claim 19, wherein
the mode signal is a sideband signal of the bus.

* * * * *